US012804468B2

(12) United States Patent
Lyu et al.

(10) Patent No.: US 12,804,468 B2
(45) Date of Patent: Nov. 17, 2026

(54) DELAY-PRIORITY-BASED SCHEDULING

(71) Applicant: Dell Products, L.P., Round Rock, TX (US)

(72) Inventors: Yongxia Lyu, Ottawa (CA); Satish Venkob, Mississauga (CA); Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 520 days.

(21) Appl. No.: 18/332,187

(22) Filed: Jun. 9, 2023

(65) Prior Publication Data

US 2024/0414593 A1 Dec. 12, 2024

(51) Int. Cl.
*H04W 28/10* (2009.01)
*H04W 28/02* (2009.01)

(52) U.S. Cl.
CPC ....... *H04W 28/10* (2013.01); *H04W 28/0231* (2013.01)

(58) Field of Classification Search
CPC ............. H04W 28/0231; H04W 28/10; H04W 72/1221
See application file for complete search history.

(56) References Cited

U.S. PATENT DOCUMENTS

2007/0259659 A1* 11/2007 Bennett ............... H04W 52/322 455/422.1
2011/0274053 A1 11/2011 Baik et al.
2020/0107339 A1* 4/2020 Prakash ............ H04W 28/0268
2020/0383004 A1* 12/2020 Hande ................... H04W 24/08
2021/0105762 A1 4/2021 Pezeshki et al.
2022/0182185 A1* 6/2022 Bostrom ............. H04L 41/5009
2024/0215053 A1* 6/2024 Elshafie ................ H04W 72/40
2024/0381137 A1* 11/2024 Kanamarlapudi .... H04W 24/08

FOREIGN PATENT DOCUMENTS

CN 110 535 705 A 12/2019

OTHER PUBLICATIONS

O-RRAN WG8: "Base Station O-DU and O-CU Software Architecture and APIs " O-RAN.WG8.AAD.0-R003-v11.00, 2023, 161 pages.

(Continued)

*Primary Examiner* — Donald L Mills
(74) *Attorney, Agent, or Firm* — Amin, Turocy & Watson, LLP

(57) ABSTRACT

A scheduler of a radio access network node may determine that at least one quality parameter corresponds to a traffic flow. Based on determining that a quality parameter, such as a priority or a latency, corresponds to the flow, the node scheduler may determine a scheduling of radio resources usable to transmit a packet of the flow. The scheduling of the resources may comprise using a conservative modulation coding scheme, high transmit power, additional antennas, or a low coating rate to increase the likelihood that a packet is successfully transmitted and received. If a quality parameter is a latency budget, and an unsuccessful transmission, and subsequent retransmission, of the packet would not violate the latency budget, the scheduler may adjust the resources such that the packet is transmitted in a less conservative manner.

20 Claims, 16 Drawing Sheets

1000

(56) References Cited

OTHER PUBLICATIONS

3GPP TR 38.824: "Study on physical layer enhancements for NR ultra-reliable and low latency case (URLLC)" V16.0.0, 2019, 78 pages.
"Scheduling (computing)" Wikipedia. [https://en.wikipedia.org/wiki/Scheduling_(computing)#Scheduling_disciplines], retrieved May 31, 2024, 14 pages.
International Search Report and Written Opinion mailed Feb. 12, 2024 for PCT Application No. PCT/US2023/036193, 12 pages.
Notification Concerning Transmittal of International Preliminary Report on Patentability mailed Dec. 18, 2025 for PCT Application No. PCT/US2023/036193, 7 pages.
European Office Action for European Patent Application No. 23817234.0 mailed Jan. 16, 2026, 3 pages.

* cited by examiner

300

500

1000

DELAY-PRIORITY-BASED SCHEDULING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption. A NR RAN node may comprise a Distributed Unit ("DU"), a Centralized Unit ("CU"), or a Radio Unit ("RU"). One or more of a DU, CU, and RU may be collocated or may be located at one or more different locations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, a communication session with a user equipment. The communication session may comprise at least one traffic flow. The method may comprise determining, by the radio access network node, that at least one quality parameter has a correspondence to the at least one traffic flow. For example, a packet of the traffic flow corresponds to a quality parameter, is associated with a quality parameter, or comprises an indication that the packer is associated with a quality parameter. Based on correspondence of the at least one quality parameter to the at least one traffic flow, the method may further comprise determining, by the radio access network node, a scheduling, according to the at least one quality parameter, of at least one radio resource usable to communicate at least one protocol data unit corresponding to the at least one traffic flow with respect to the user equipment, to result in a determined scheduling. The method may further comprise facilitating, by the radio access network node, communicating at least one of the at least one protocol data unit corresponding to the at least one traffic flow via the at least one radio resource according to the determined scheduling. The at least one quality parameter may be at least one of: a latency budget parameter, a reliability parameter, or a priority parameter.

In an embodiment, the determined scheduling may correspond to scheduling usage of at least one of: a modulation scheme, a coding rate, a transmission power level, a precoding function, a spatial multiplexing function, or a diversity coding function, to be used to transmit the at least one protocol data unit.

In an embodiment, the at least one traffic flow may be a first traffic flow, the correspondence may be a first correspondence, the at least one protocol data unit may be at least one first protocol data unit, the determined scheduling may be a first determined scheduling, and the communication session may further comprise a second traffic flow. In the embodiment, the method may further comprise determining, by the radio access network node, a second correspondence of the at least one quality parameter to the second traffic flow. Based on the at least one quality parameter being determined not to have the second correspondence to the second traffic flow, the method may further comprise determining, by the radio access network node, a second scheduling of the at least one radio resource to be usable to communicate, with respect to the user equipment, at least one second protocol data unit corresponding to the second traffic flow, to result in a second determined scheduling, wherein the at least one quality parameter is excluded from the determining of the second scheduling.

In an embodiment, the correspondence of the at least one quality parameter to the at least one traffic flow may comprise noncorrespondence of the at least one quality parameter to the at least one traffic flow, wherein the at least one quality parameter is a latency budget parameter corresponding to the at least one protocol data unit. (E.g., a quality parameter may not be associated with the at least one traffic flow, or if a latency budget is associated with the traffic flow, an unsuccessful transmission of a packet corresponding to the traffic flow during I next available transmission opportunity and a subsequent retransmission attempt of the packet would not result in a violation of the latency budget.) The method may further comprise, based on the noncorrespondence of the at least one quality parameter to the at least one traffic flow, determining, by the radio access network node, that more than one transmission opportunity corresponding to the at least one protocol data unit is available with respect to the latency budget parameter. The at least one traffic flow may be associated with a desired error rate, the determined scheduling may comprise the at least one protocol data unit being scheduled for transmission at a target error rate that exceeds the desired error rate. The determined scheduling further comprises applying at least one of: proportional-fair scheduling or round robin scheduling.

In an embodiment, the at least one quality parameter that corresponds to the at least one traffic flow may comprises a latency budget parameter corresponding to the at least one protocol data unit, and the method may further comprise determining, by the radio access network node, that a transmission opportunity corresponding to the at least one protocol data unit is a last transmission opportunity with respect to the latency budget corresponding to the at least one protocol data unit. The at least one traffic flow may be associated with a desired error rate, and the determined scheduling may comprise the at least one protocol data unit being scheduled for transmission at a target error rate that corresponds to the desired error rate. The communication session may be associated with a baseline modulation and coding scheme that comprises a baseline coding rate and a baseline transmit power. The determined scheduling may further comprise the at least one protocol data unit being scheduled for transmission according to at least one of: a low coding rate that is lower than the baseline coding rate or a high transmit power that is higher than the baseline transmit power.

In an embodiment, the at least one traffic flow may be a first traffic flow, the determined scheduling may be a first determined scheduling, the correspondence may be a first correspondence, the at least one quality parameter may be a first quality parameter, and the user equipment may be a first user equipment. In the embodiment, the method may further comprise facilitating, by the radio access network node with a second user equipment, a second communication session comprising at least a second traffic flow and facilitating, by the radio access network node, determining a second correspondence of the second traffic flow to a second quality parameter. Based on the second quality parameter being determined not to have the second correspondence to the second traffic flow, the method may further comprise determining, by the radio access network node, a second scheduling of the at least one radio resource to be usable to communicate, with respect to the second user equipment, at least one protocol data unit corresponding to the second traffic flow, to result in a second determined scheduling, wherein the second quality parameter is excluded from the determining of the second scheduling. The first user equipment may be a member of a first group of user equipment corresponding to first traffic flows associated with the first quality parameter. The second user equipment may be a member of a second group of user equipment corresponding to second traffic flows associated with the second quality parameter. The first quality parameter and the second quality parameter may comprise a same parameter. The first determined scheduling may specify and the second determined scheduling may specify that communicating the first traffic flows is to be facilitated before communicating the second traffic flows is facilitated.

In another example embodiment, a radio access network node may comprise a processor configured to determine that at least one quality parameter metric corresponding to at least one traffic flow between the radio access network node and a user equipment satisfies a scheduling adjustment criterion to result in a determined quality parameter metric. Based on the determined quality parameter metric, the processor may be further configured to schedule at least one protocol data unit corresponding to the at least one traffic flow according to at least one adjusted radio resource to result in a determined scheduling. The processor may be further configured to communicate at least one of the at least one protocol data unit corresponding to the at least one traffic flow via the at least one adjusted radio resource according to the determined scheduling. At least one of the at least one adjusted radio resource may correspond to at least one of: an adjusted modulation scheme, an adjusted coding rate, or an adjusted transmit power.

In an embodiment, the determined quality parameter metric may correspond to a latency budget associated with the at least one traffic flow. The determined quality parameter metric may comprise an indication of a number of transmission opportunities remaining before the latency budget is violated with respect to the at least one traffic flow. The scheduling adjustment criterion may be satisfied by the determined quality parameter metric being indicative that a next transmission opportunity is a last transmission opportunity before the latency budget is violated. The at least one traffic flow may correspond to a desired error rate, and the determined scheduling may comprise configuring a transmitter to transmit the at least one protocol data unit corresponding to the at least one traffic flow according to a modulation scheme corresponding to the desired error rate.

In an embodiment, the at least one traffic flow may be a first traffic flow, the at least one protocol data unit may be at least one first protocol data unit, the determined quality parameter metric may be a first determined quality parameter metric, and the processor may be further configured to determine that at least one quality parameter metric corresponding to a second traffic flow satisfies the scheduling adjustment criterion to result in a second determined quality parameter metric. The processor may be further configured to, based on the second determined quality parameter metric, schedule at least one second protocol data unit corresponding to the second traffic flow according to the at least one adjusted radio resource to result in the determined scheduling. The processor may be further configured to communicate the at least one of the at least one first protocol data unit corresponding to the first traffic flow and the at least one second protocol data unit corresponding to the second traffic flow via the at least one adjusted radio resource according to a round robin order.

In another example embodiment, a non-transitory machine-readable medium may comprise executable instructions that, when executed by a processor of a radio access network node, facilitate performance of operations, comprising operating a first communication session comprising one or more first packets corresponding to one or more first traffic flows with at least one first user equipment corresponding to a first group of one or more first user equipment, wherein the one or more first packets are associated with a first reliability criterion. The operations may further comprise operating a second communication session comprising one or more second packets corresponding to one or more second traffic flows with at least one second user equipment corresponding to a second group of one or more second user equipment. The one or more second packets may be associated with a second reliability criterion. The operations may further comprise determining a first reliability metric corresponding to the one or more first packets corresponding to the one or more first traffic flows and determining a second reliability metric corresponding to the one or more second packets corresponding to the one or more second traffic flows. The operations may further comprise analyzing the first reliability metric with respect to the first reliability criterion to result in an analyzed first reliability metric and analyzing the second reliability metric with respect to the second reliability criterion to result in an analyzed second reliability metric. The operations may further comprise determining that the analyzed first reliability metric fails to satisfy the first reliability criterion and determining that the analyzed second reliability metric satisfies the second reliability criterion. Based on the analyzed first reliability metric failing to satisfy the first reliability criterion, the operations may further comprise scheduling at least one of the one or more first packets corresponding to the one or more first traffic flows according to a first radio resources capability to result in a first determined scheduling. Based on the analyzed second reliability metric satisfying the second reliability criterion, the operations may further comprise scheduling at least one of the one or more second packets corresponding to the one or more second traffic flows according to a second radio resources capability to result in a first determined scheduling. The operations may further comprise communicating the at least one of the one or more first packets corresponding to the one or more first traffic flows according to the first determined scheduling and communicating the at least one of the one or more second packets corresponding to the one or more second traffic flows according to the second determined scheduling.

In an embodiment, the second radio resources capability may comprise at least one of: a baseline modulation scheme corresponding to a baseline error rate, a baseline coding rate, a baseline transmit power, or a baseline antenna activation arrangement mode. The first radio resources capability may comprise at least one of: an optimized modulation scheme corresponding to a lower error rate than the baseline error rate, an optimized coding rate that is lower than the baseline coding rate, an optimized transit power that is higher than the baseline transmit power, or an optimized antenna activation arrangement mode that comprises more active antennas than the baseline antenna activation arrangement mode comprises.

In an embodiment, the first determined scheduling may comprise prioritizing the communicating the at least one of the one or more first packets corresponding to the one or more first traffic flows according to the first determined scheduling according to a proportional fair function.

In an embodiment, the at least one of the one or more first packets corresponding to the one or more first traffic flows may be communicated according to the first determined scheduling before the at least one of the one or more second packets corresponding to the one or more second traffic flows are communicated according to the second determined scheduling.

In an embodiment, the operations may further comprise analyzing a latency metric corresponding to the at least one of the one or more first packets corresponding to the one or more first traffic flows with respect to a latency criterion to result in an analyzed latency metric, wherein the first determined scheduling is further based on the analyzed latency metric.

DETAILED DESCRIPTION OF THE DRAWINGS

Figure 1:
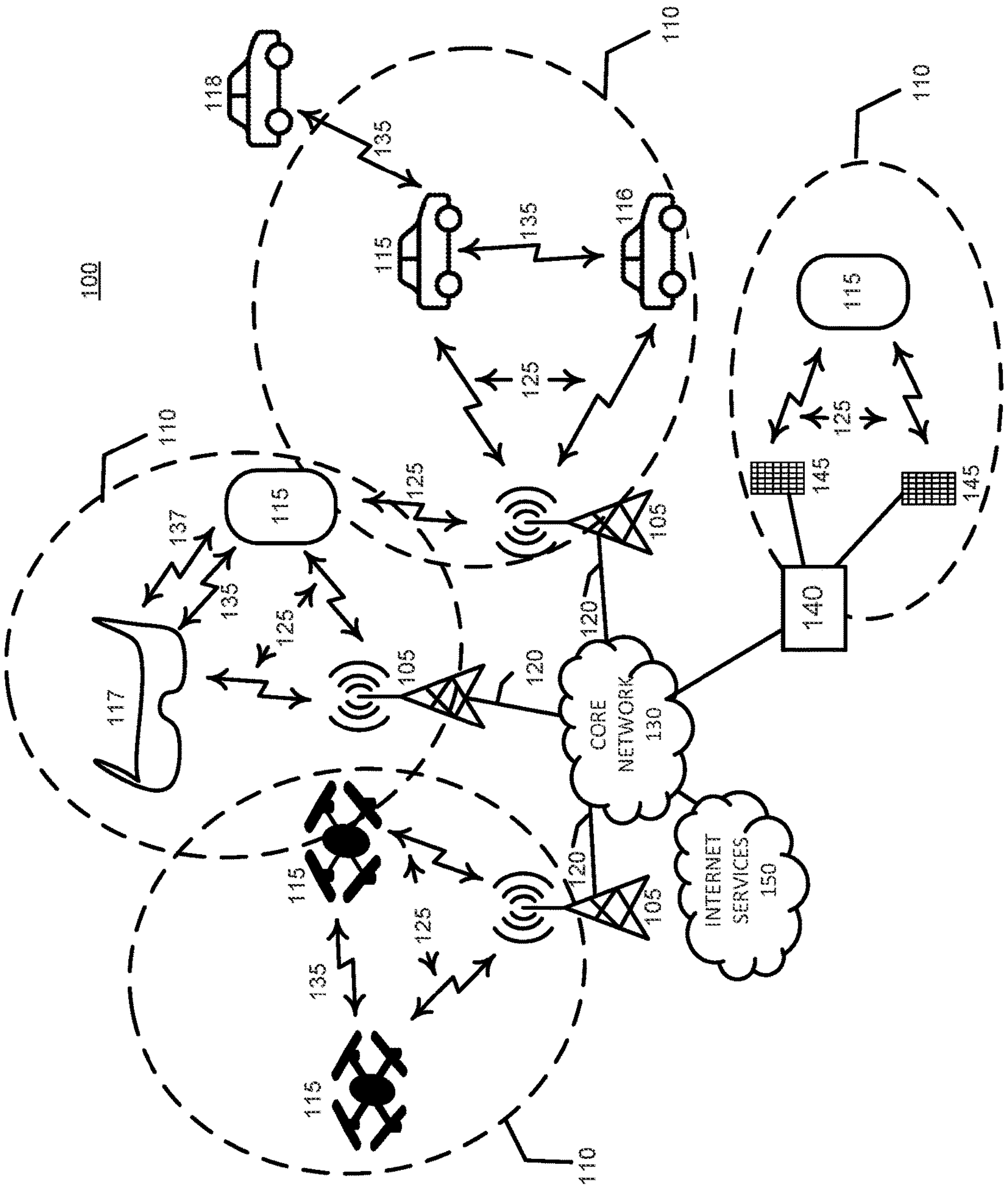
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 millisecond (ms) radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate, but may also be sporadic, or bursty, in nature. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic while minimizing power consumption.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 13.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office).

A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Figure 2A:
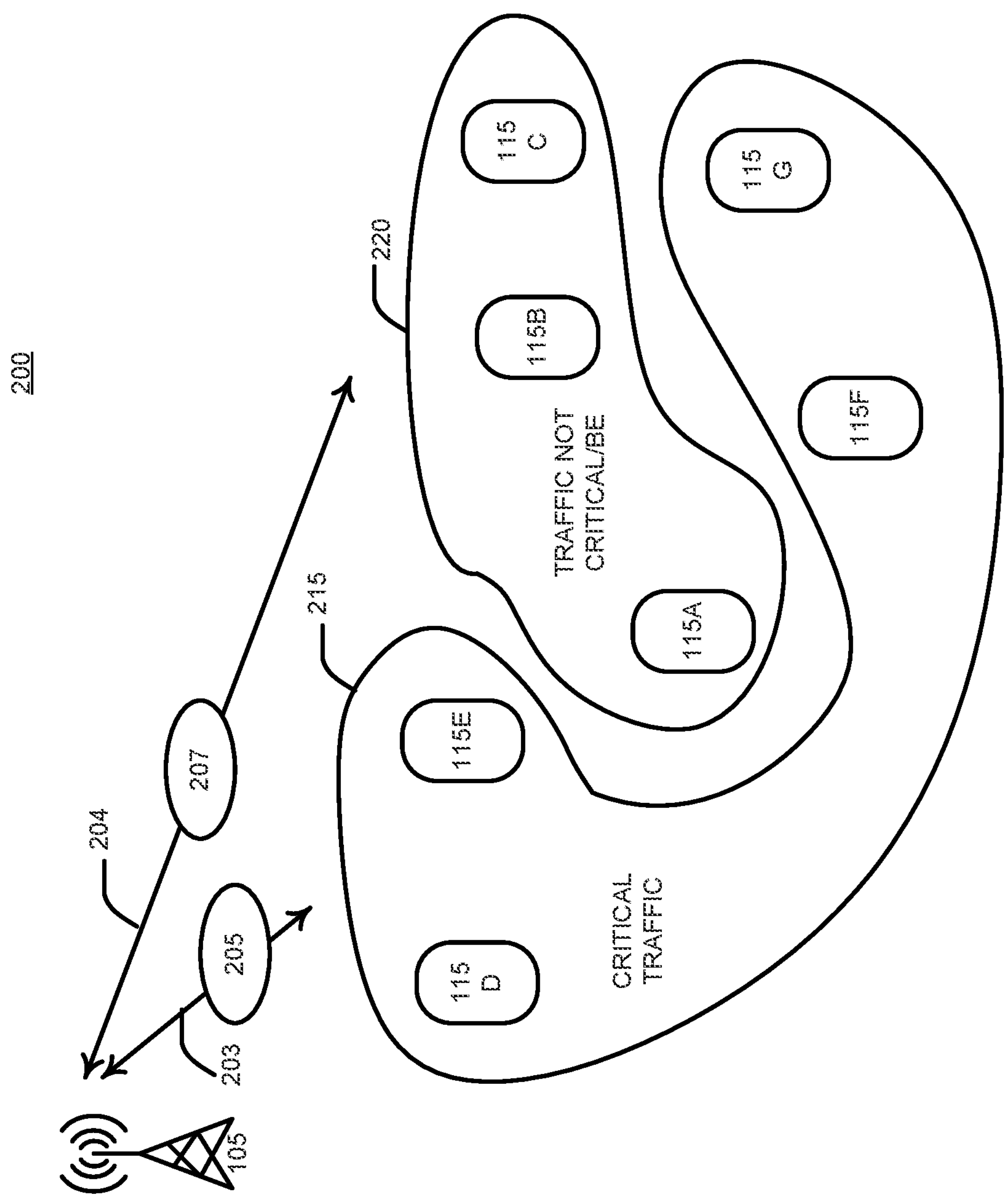
FIG. 2A illustrates an example environment with multiple user equipment in communication range of a radio access network node.

Turning now to FIG. 2A, the figure illustrates an example environment 200 with multiple user equipment 115 in multiple user equipment groups 215 and 220. Group 220 may comprise user equipment 115A, 115B, and 115C. User equipment of group 220 may be grouped together because they are not operating communication sessions 203 that may comprise critical traffic. Thus, for example, radio access network node 105 may schedule radio resources usable to communicate traffic corresponding to user equipment of group 220 according to one or more quality parameters 207 determined to correspond to the user equipment of group 220. RAN 105 may determine quality parameters 207 corresponding to group 220 based on one or more indications associated with traffic corresponding to the user equipment of group 220. Examples of quality parameters 207 may comprise a latency, a latency budget on the cusp of being violated, a priority, and the like.

Similarly, group 215 may comprise user equipment 115D, 115E, 115F, and 115G. User equipment of group 215 may be grouped together because they are operating communication sessions 203 that may comprise critical traffic. Thus, for example, radio access network node 105 may schedule radio resources usable to communicate traffic corresponding to user equipment of group 215 according to one or more quality parameters 205 determined to correspond to the user equipment of group 220. RAN 105 may determine the quality parameters 205 corresponding to group 220 based on one or more indications associated with traffic corresponding to the user equipment of group 220. Examples of quality parameters 205 may comprise a latency, a latency budget on the cusp of being violated, a priority, a reliability, or the like. User equipment corresponding to group 220 may be grouped based on communication session flows 204 having a low reliability metric (e.g., best effort traffic) whereas user equipment corresponding to group 215 may be grouped based on communication session flows 203 having a high reliability metric (e.g., a low tolerance for discarding of packets or for late-arriving packets).

Figure 2B:
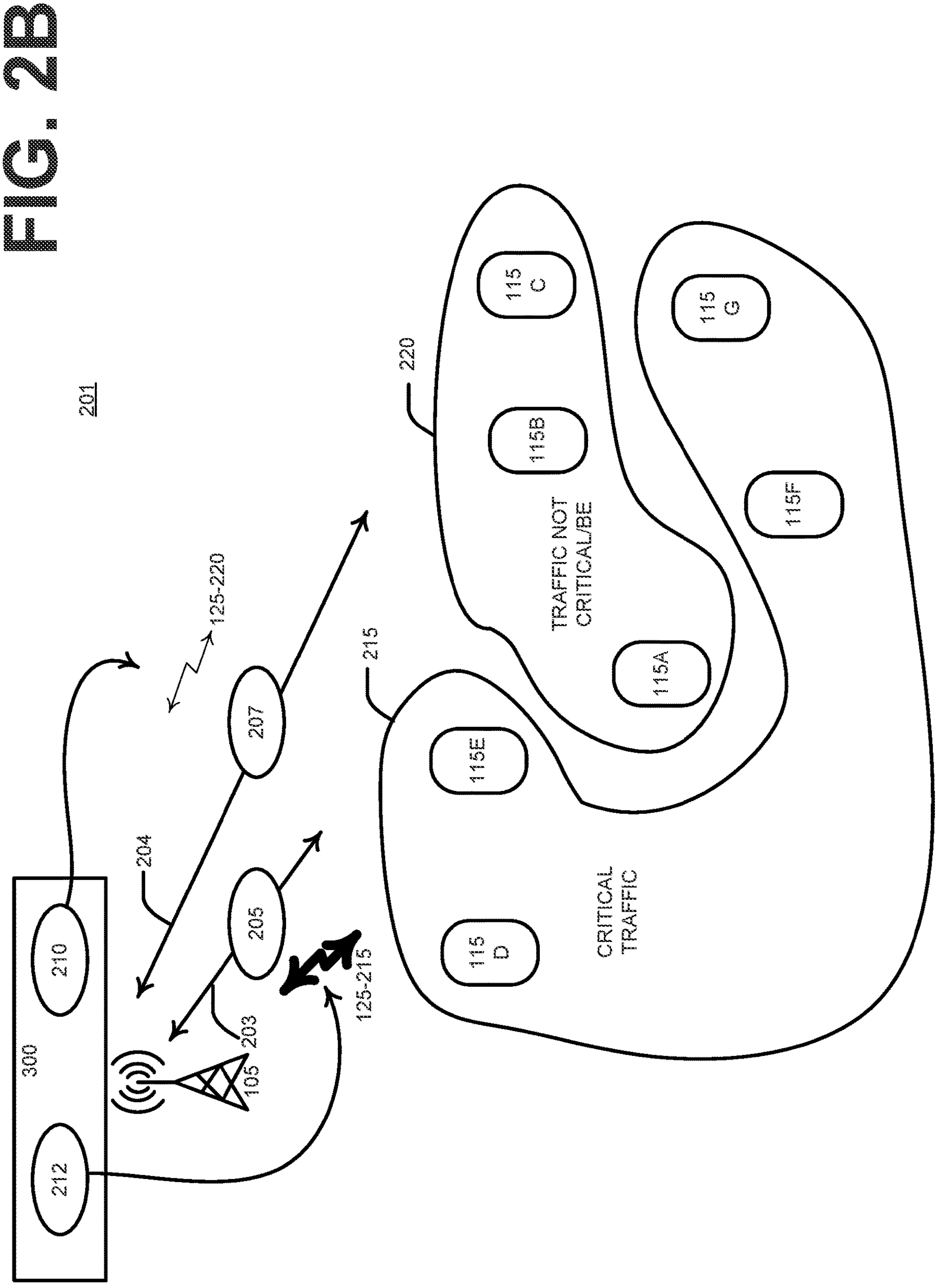
FIG. 2B illustrates an example environment with radio resources being scheduled for traffic corresponding to multiple user equipment according to at least one traffic characteristic.

Turning now to FIG. 2B, the figure illustrates environment 201 in which RAN node 105 comprise scheduler 300. Scheduler 300, based on quality parameters 205 or 207, has scheduled radio resources corresponding to wireless link 125-215 and wireless link 125-220, respectively, to facilitate communication sessions 203 and 204, respectively. As illustrated in FIG. 2B, wireless link 125-215 is shown with a heavy line weight compared to the line weight of wireless link 125-220, which is shown in a light line weight of, to indicate that scheduler 300 has scheduled radio resources based on correspondence of at least one quality parameter to the at least one traffic flow corresponding to communication sessions 203 or 204. Scheduler 300 may determine scheduling, according to the at least one quality parameter, of at least one radio resource usable to communicate at least one protocol data unit corresponding to the at least one traffic flow with respect to the user equipment, to result in a determined scheduling. Radio access network node 105 may facilitate communicating at least one of the at least one protocol data unit corresponding to the at least one traffic flow via the at least one radio resource according to the determined scheduling. Scheduler 300 may determine scheduling of traffic corresponding to user equipment of group 215 based on at least one quality parameter that may be, for example, a latency budget parameter, a reliability parameter, or a priority parameter. The heavy line weight corresponding to wireless link 125-215 in FIG. 2B may be indicative that scheduler 300 has adjusted radio resources to provide preferential treatment of protocol data units (e.g., packets) corresponding to traffic flows to or from user equipment of group 215, while scheduling traffic corresponding to user equipment of group 220 according to a lower priority, as shown by the lighter line weight corresponding to wireless link 125-220. Determined scheduling preferential treatment of traffic flow packets corresponding to user equipment of group 215 may comprise adjusting a modulation scheme, a coding rate, a transmission power level, a precoding function, a spatial multiplexing function, or a diversity coding function to be more conservative than may correspond to scheduling of resources usable for traffic corresponding to user equipment of group 220.

For example, if a packet of a traffic flow corresponding to a user equipment of 215 is associated with a latency budget, and the latency budget with respect to time will be violated if the packet is not transmitted to or from the user equipment at a next available transmission opportunity, a slower coating rate or a more conservative modulation scheme or a higher transmit power or use of more antennas may increase the likelihood that the packet is delivered if transmitted during a next available transmission opportunity. Although such conservative adjustment of radio resources may result in a slower, or lower, data rate corresponding to the traffic flow, if the traffic flow is associated with a high reliability criterion and a low latency criterion, satisfaction of the latency or reliability/priority criterion may take precedence over system data rate/throughput.

Figure 2C:
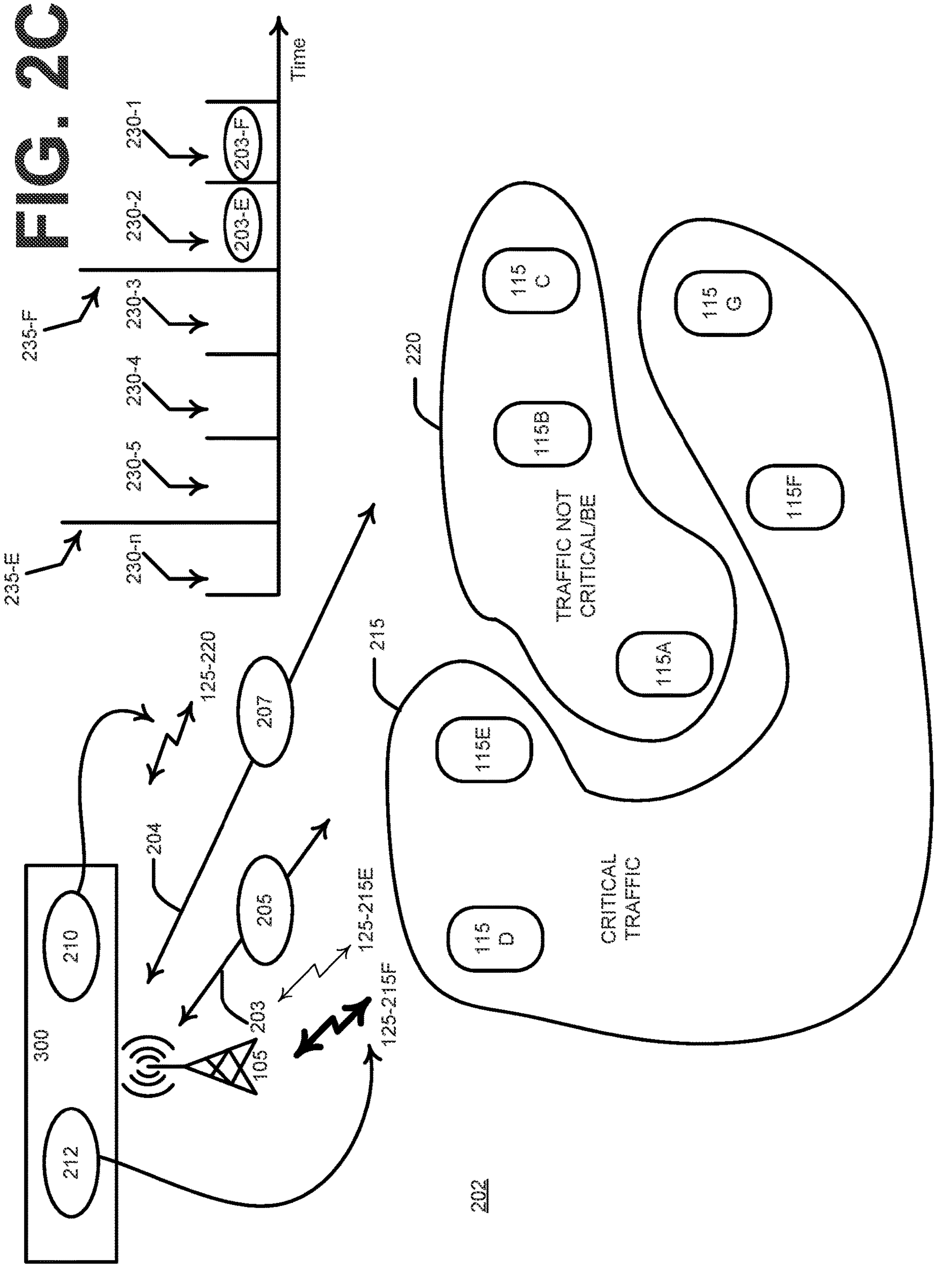
FIG. 2C illustrates an example environment with a next available transmission opportunity being a last traffic flow opportunity before a traffic flow packet violates a latency budget.

FIG. 2C illustrates an example environment 202 with a next available transmission opportunity being a last traffic flow opportunity before a traffic flow packet violates a latency budget. Timeline 231 comprises multiple transmission opportunities 230-A-230-*n* usable by radio access network 105 to transmit packets corresponding to communication sessions 203 and 204 to user equipment of groups 215 or 220. As shown in FIG. 2C, packet 203-F, which corresponds to a traffic flow 203 directed to user equipment 115F of group 215, is currently scheduled for transmission during transmission opportunity 230-1 and packet 203-E, which corresponds to a traffic flow 203 directed to user equipment 115E of group 215, is currently scheduled for transmission during transmission opportunity 230-2.

For packet 203-E, transmission opportunities 230-3, 230-4, and 230-5 (and potentially opportunity 230-2) are available before latency budget limit 235-E corresponding to packet 203-E is violated. Thus, since multiple transmission opportunities 230 are available before latency budget 235-E is violated, a scheduler at radio access network node 105 may not alter a scheduling of packet 203-E, based on a quality parameter 205 such as latency budget 235-E, of at least one radio resource corresponding to link 125-215E, such as a modulation scheme, cording scheme, transmit power, and the like usable to communicate packet 203-E to UE 115E.

However, for packet 203-F, transmission opportunity 230-2 is a next available transmission opportunity with respect to current transmission opportunity 230-1, during which packet 203-F is currently scheduled. Next transmission opportunity 230-2 is a last next available transmission opportunity before latency budget limit 235-F, which may be a quality parameter 207 corresponding to communication session 203, corresponding to packet 203-F is violated. Accordingly, a scheduler at radio access network node 105 may schedule conservative radio functionality settings, such as for example, a modulation scheme, a coding rate, a transmit power level, or other radio functionality resource setting, with respect to link 125-215F to be usable to transmit packet 203-F to UE 115F during next available transmission opportunity 230-2. Although potentially reducing data throughput of link 125-215F, using more conservative radio functionality resources corresponding to link 125-215F to schedule the transmission of packet 203-F increases a likelihood of packet 203-F being successfully transmitted and received by user equipment 115 F before latency budget 235-F is violated. It will be appreciated that timeline 231 shows transmission opportunities with respect to latency budget limits, but other opportunities, for example control channel opportunities may, be interleaved with transmission opportunities 230 but are not shown. It will also be appreciated that wireless link 125-215F is shown in FIG. 2C with a heavy weight to indicate conservative resource settings being scheduled as being usable to transmit packet 203-F to increase the likelihood of the packet reaching user equipment 115F before latency budget limit 235-F is violated. For transmission of packet 203-E to user equipment 115E, resources of wireless link 125-215 may be scheduled according to less conservative (e.g., more aggressive) resource settings, which may result in higher data throughput and which are indicated by a light line weight to indicate scheduling of radio functionality resource setting usable to transmit packet 203-E to UE 115E being more aggressive (e.g., more complex modulation scheme, faster coding rate, less transmit power, and the like) since there are multiple transmission opportunities 230 available to transmit packet 230-E before latency budget limit 235-E, which may be referred to as a latency criterion, is violated. It will also be appreciated that for traffic associated with quality parameter (s) 207 corresponding to noncritical traffic (e.g., packets of traffic associated with communication session 204 do not correspond to a latency budget or to a high reliability) scheduled for transmission to user equipment of group 220, traffic of one or more traffic flows 204 may be scheduled according to baseline radio functionality resource settings, which in an embodiment may be the same as the more aggressive resource settings schedule to be usable to transmit packet 203-E. Accordingly, consideration of at least one quality parameter 205 may be excluded from the determining of scheduling of packet 203-E according to aggressive resource settings, indicated in FIG. 2C by the light line weight of link 125-215E, because a quality parameter 205 (e.g., a soon-to-be-violated latency budget) that had correspondence to packet 203-F is determined as not having correspondence to packet 203-E, and thus packet 203-E can be scheduled for transmission according to higher throughput resources settings than are scheduled as usable for transmission of packet 203-F. It will be appreciated, however, that if packet 203-E is not successfully transmitted and received from radio access network node 105 to user equipment 115 E at least by transmission opportunity 230-4 for example, a latency budget 235-E may be deemed as soon-to-be-violated, and conservative radio resource functionality settings that are indicated by link 125-215 may be scheduled as usable to transmit packet 203-E to UE 115E. In an embodiment, user equipment of group 215 may be referred to as a priority group, or priority pool, and user equipment of group 220 may be referred to is a non-priority group, or a non-priority pool.

Layer 2 Medium Access Controller Scheduler in O-DU.

Figure 3:
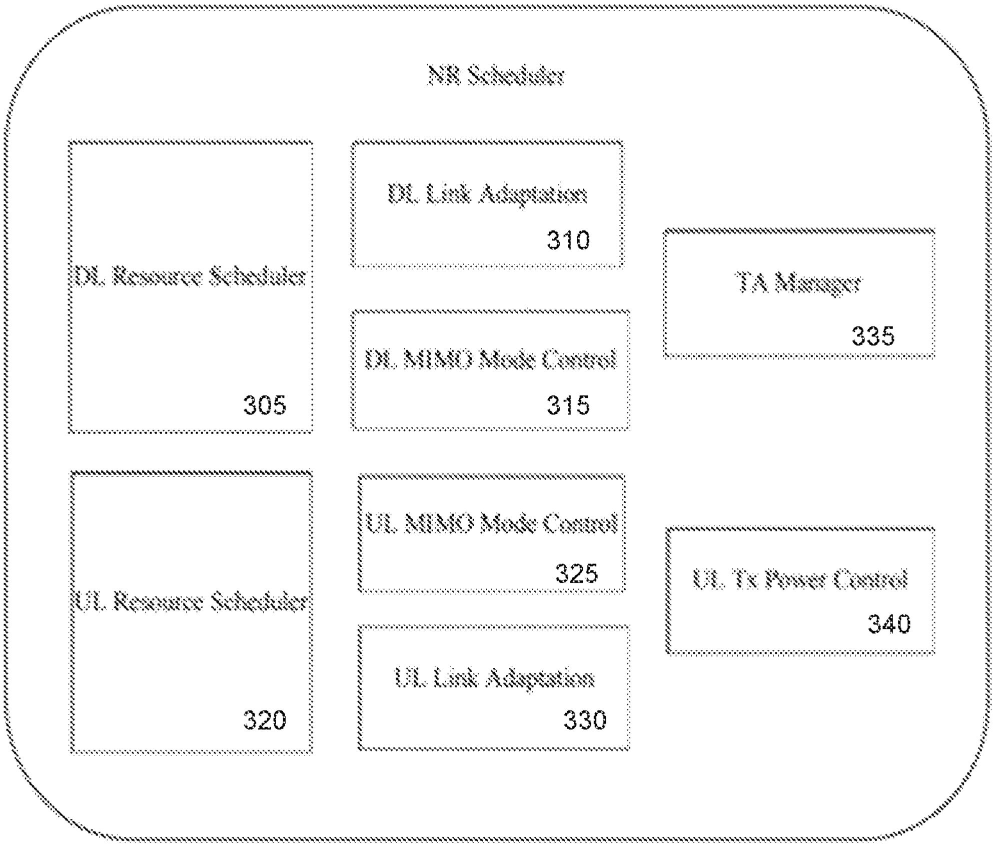
FIG. 3 illustrates an example Level 2 Media Access Control scheduler.

Components of a layer 2 ("L2") Medium Access Controller ("MAC") scheduler 300 are shown in FIG. 3. A DU of a radio access network node may comprise components of L2 MAC scheduler 300. In some implementations, a DU may comprise MAC and scheduler functions implemented in the same physical platform. Scheduler 300 is shown with functional sub-blocks corresponding to scheduler functionality. It will be appreciated that a MAC scheduler may be arranged differently than is shown in FIG. 3 or may comprise different functional blocks than are shown in FIG. 3.

Example scheduler 300 may comprise downlink ("DL") resource scheduler 305 and uplink ("UL") resource scheduler 320. Resource schedulers 305 and 320 may facilitate functionality of time-domain and frequency domain scheduling of traffic in DL and UL directions, respectively. Resource scheduling may be performed per a configured scheduling period and may be performed for a single slot or multiple slots. Resource scheduling may comprise facilitating functionality that may include for example: beam selection; user equipment selection and selection of bearers, corresponding to user equipment, per scheduling period; allocation of radio resources for PDCCH, PUSCH, PDSCH, and associated channels like DMRS channels. Beam selection may be based on various beamforming methods. In the case of predefined beamforming methods, an index, which may be referred to as "beamId", may be indicative of a specific beam pre-defined in an RU to use in case of hybrid architecture. However, in case of hierarchical architecture, beam indices may be pre-defined in a DU. A beam selection function may select a beam index/beamId that is applied to DL or UL data.

Example scheduler 300 may comprise DL Link Adaptation ("LA") function 310 or UL LA 330. LA functionality may be based on channel quality information reported by a user equipment regarding channel radio conditions corresponding to the user equipment. Instead of being based on channel condition information reported by a UE, LA may be based on channel condition information estimated at a gNB/RAN node and corrected using a block error rate ("BLER"). Selection of, or adjustment of, radio resources, such as a Modulation and Coding Scheme ("MCS") may be facilitated by LA and may be used to allocate radio channel resources to user equipment.

Example scheduler 300 may comprise UL Transmit Power Control function 340. UL Transmit Power Control function 340 may facilitate closed-loop UL power control for PUSCH, SRS and PUCCH channels. UL Transmit Power Control function 340 may estimate UL transmit power based on UE feedback (e.g., a power headroom report) or measured signal strengths corresponding to UL channels.

Example scheduler 300 may comprise DL Multiple Input and Multiple Output ("MIMO") Mode Control function 315 and UL MINO Control function 325. MINO control functions 315 and 325 may determine a MIMO mode corresponding to a user equipment, in DL and UL directions, respectively, to be used along with a corresponding precoding matrix.

Example scheduler 300 may comprise Timing Advance ("TA") Manager function 335, which may facilitate estimating or determining a TA command, or TA value, corresponding to a UE based on information received via PUSCH, PUCCH and SRS signals.

Performance metrics corresponding to scheduler 300 (e.g., capacity, throughput, etc.) may be based on software implementation or underlying hardware. Scheduler 300 may also include functionality to facilitate slice differentiation, for example as specified by radio resource Management ("RRM") policy, for resource types, (e.g., a physical resource block type ("PRB") to satisfy a service level or a quality level (e.g., a quality or service level corresponding to a service level agreement). Scheduler 300 may evaluate at least one slice metric to determine a scheduling prioritization, which may correspond to a particular Transmission Time Interval ("TTI") that enables a gNB DU system to satisfy a service level agreement corresponding to a resource slice.

Proportional-fair ("PF") scheduling is a compromise-based scheduling algorithm. It is based upon maintaining a balance between two competing interests: trying to maximize total throughput of the network (wired or not) while at the same time allowing all users at least a minimal level of service. This is typically implemented by assigning a data flow a data rate or a scheduling priority (depending on the implementation) that is inversely proportional to its anticipated resource consumption.

A scheduler may schedule data transfer to achieve a desired PF target through the use of prioritization coefficients. A channel for a user equipment or a RAN node may be scheduled according to a maximum of the priority function shown in eq. 1, $$P\frac{T^{\alpha}}{R^{\beta}}, \quad \text{eq. 1}$$

wherein T denotes the data rate potentially achievable for the station in the present time slot, R is the historical average data rate of this station, and α and β tune the "fairness" of the scheduler. By adjusting α and β shown in eq. 1, the balance between serving the best mobiles (the ones in the best channel conditions) more often and serving UE devices that consume a disproportionate amount of resources relative to UE devices associated with good channel conditions (e.g., more resources scheduled that result is fewer successful transmissions and receptions due to poor channel conditions) often enough may be adjusted to facilitate an acceptable level of performance. In the extreme case ($\alpha=0$ and $\beta=1$) the scheduler may act in a round-robin fashion and serve all UEs equally often, with no regard for resource consumption. If $\alpha=1$ and $\beta=0$ then the scheduler will always serve the mobile with the best channel conditions. This will maximize the throughput of the channel while UEs with low T are not served at all. Using $\alpha\sim=1$ and $\beta\sim=1$ may result in proportional fair scheduling. This technique can be further parametrized by using a "memory constant" that determines the period of time over which a data rate corresponding to a UE used in calculating the priority function is averaged. A larger constant generally improves throughput at the expense of reduced short-term fairness. Using a round-robin ("RR") scheduling function, time slices or frequency resource (also referred to as time quanta) may be assigned to a process, (e.g., transmission of packets to different user equipment, in equal portions and in circular order, handling processes without regard to priority. RR scheduling is simple, easy to implement, and generally starvation-free.

A typical URLLC use cases may correspond to a 1 ms-5 ms end-to-end ("E2E") latency requirement with a 99.999%-99.999999999% reliability requirement. According to conventional techniques, an L2 MAC scheduler does not take a latency budget of each packet of a traffic flow into account and does not facilitate support for the URLLC packet transmissions within certain latency budget. Using embodiments disclosed herein, an L2 MAC scheduler may support URLLC packet transmission while supporting non-URLLC services traffic. Embodiments disclosed herein may apply latency budget and low BLER/High reliability metrics to scheduling determination.

Figure 4:
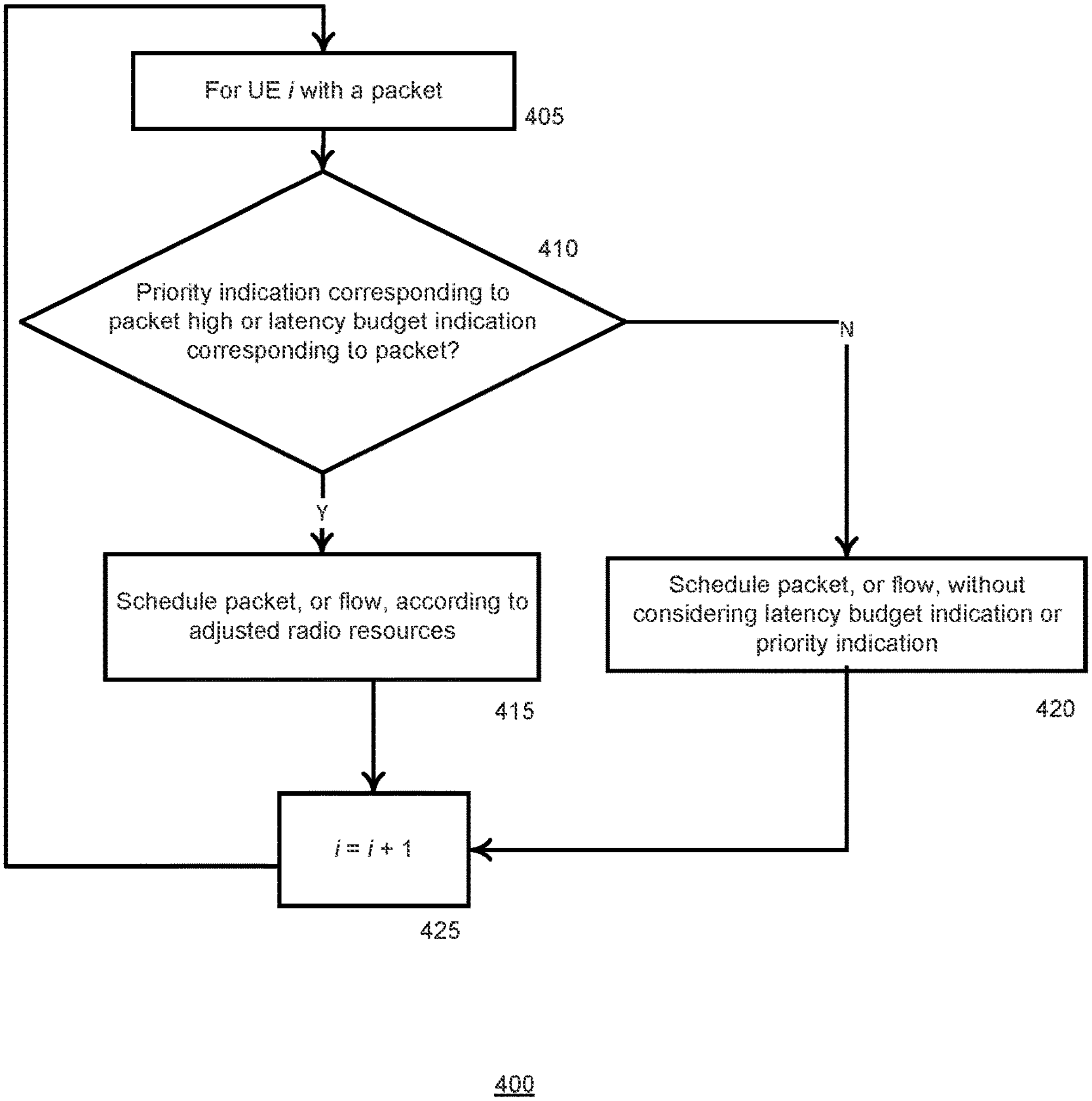
FIG. 4 illustrates a flow diagram of an example method to schedule traffic according to a traffic characteristic.

Turning now to FIG. 4, the figure illustrates an example method 400 to determine scheduling of traffic flow packets based on correspondence of the traffic flow packets to a priority indication or a latency budget indication. Example method 400 may be facilitated by a distributed unit scheduler, such as scheduler 300 described in reference to FIG. 2B and FIG. 3. Continuing with description of FIG. 4, A scheduler may evaluate one or more packets corresponding to a user equipment at act 405. At act 410, the scheduler may determine whether the one or more packets corresponds to a quality parameter, for example a priority indication that the packet corresponds to a traffic flow associated with a high reliability requirement, or the quality parameter may correspond to a latency budget. The scheduler may determine a time when the latency budget associated with the packet being evaluated may be violated. If a next available transmission opportunity would be a last transmission opportunity that the packet could be transmitted before the latency budget corresponding to the packet being evaluated would be violated, the scheduler may determine at act 410 to adjust radio resources usable for transmission of the packet at the next available transmission opportunity to increase the likelihood that the packet will be successfully delivered to the user equipment to which the packet corresponds. At act 415, the scheduler may cause scheduling of radio resources, for example a modulation scheme, a transmit power level, a coding rate, a number of antennas, and the like, to be adjusted to settings that may reduce packet throughput with respect to the user equipment or the radio access network node to which the scheduler corresponds, but that may increase the likelihood that the packet is successfully received after transmission during the next available transmission opportunity.

Returning to description of 410, if the scheduler determines that the packet being evaluated does not correspond to a priority indication and does not correspond to a latency budget indication, or at least correspond to a latency budget indication indicative that a latency budget may be violated if the packet is not successfully transmitted at the next available transmission opportunity, the scheduler may schedule the packet according to baseline radio resource functionality setting, or other radio resource functionality settings, that may correspond to less conservative radio resource function settings than the adjusted setting(s) determined at act 415, and that may not consider a latency budget or priority corresponding to the packet. Accordingly, URLLC service (e.g., traffic packets corresponding to a latency budget indication or a high priority indication) and non-URLLC service traffic packets may be scheduled according to radio resources that are adjusted to, or customized to, the traffic being transmitted to facilitate a balance between satisfying URLLC quality parameter requirements and system throughput/capacity. To facilitate different treatment of traffic flow packets based on traffic characteristics, or traffic quality parameters, a scheduler may calculate a priority function P based on packet delay budget ("PDB") and a guaranteed bit rate ("GBR). For a packet corresponding to a priority indication or a latency budget, a scheduler may schedule the packet according to adjustment of radio resource functionality that may be optimized to the traffic packets and radio channel conditions while otherwise scheduling packets according to a conventional scheduling function, or example a PF scheduling function.

Figure 5:
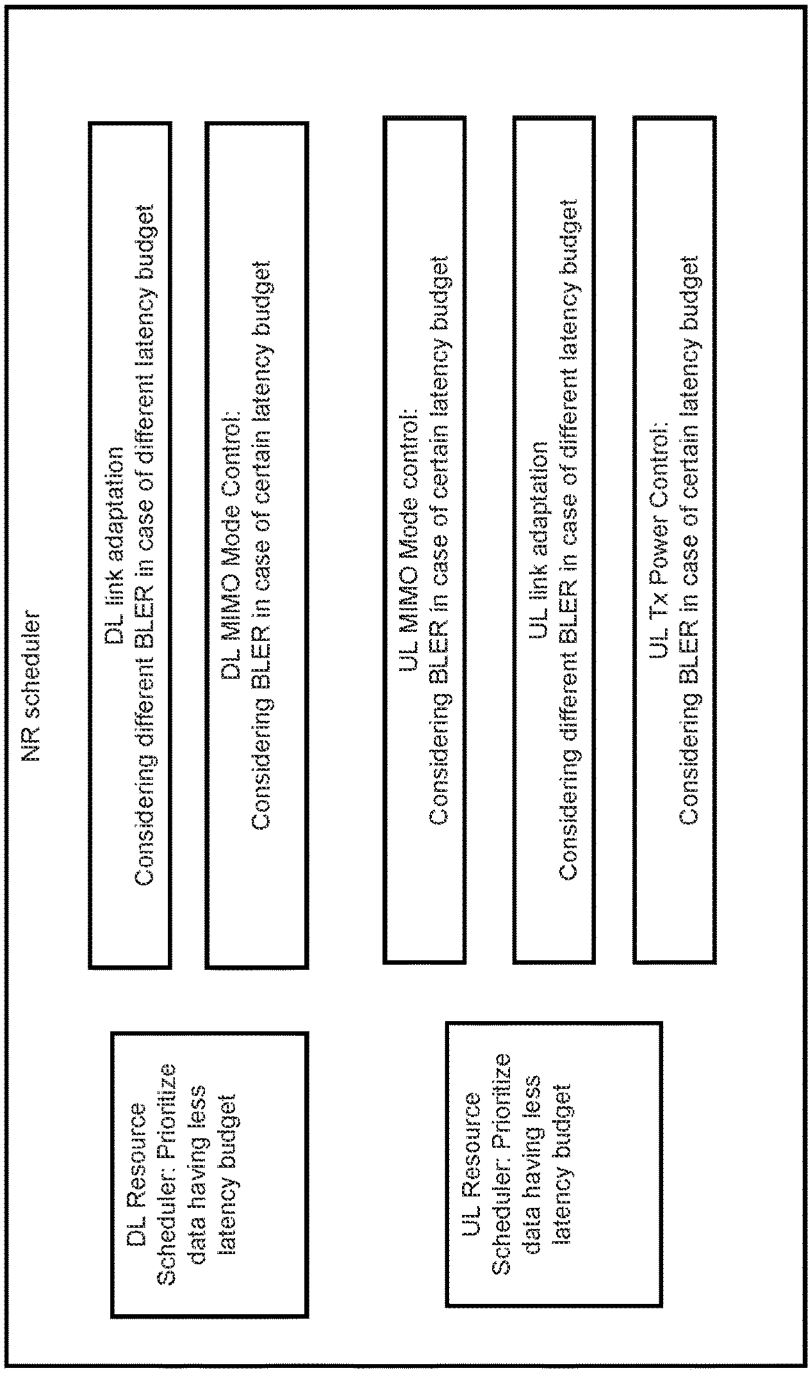
FIG. 5 illustrates an example scheduler that considers block error rates corresponding to traffic to determine scheduling of the traffic.

FIG. 5 illustrates an example scheduler that considers block error rates corresponding to traffic to determine scheduling of the traffic. Thus, using embodiments disclosed herein, balance between satisfying a latency requirement and system throughput (a highest throughput may not always result in satisfying a latency requirement for some packets) may be achieved. Embodiments disclosed herein may satisfy a latency requirement or a high priority requirement for packets by considering a latency requirement (e.g., a PDB) or a high priority indication (e.g., a 5QI metric), and maximum system throughput with respect to user equipment in a group (such as group 215 described in reference to FIG. 2A, 2B, or 2C), which may be referred to as a user equipment priority pool. Embodiments disclosed herein may facilitate satisfying an extreme end-to-end latency requirement but may tolerate lower spectrum efficiency or lower total system throughput.

Instead of only using a conventional PF scheduler to balance user equipment fairness and system throughput while meeting basic QOS (e.g., GBR) parameters in a best effort manner, which may not be optimal for user equipment operating communication session corresponding to traffic having critical latency and reliability requirements. According to embodiments disclosed herein, a scheduler, such as scheduler 300 described in reference to FIG. 3, may determine scheduling using a priority function based on PDB, GBR, or 5QI, and may prioritize packets with very strict PDB by adjusting a PDB coefficient or by scheduling a packet associated with a PDB or with a high priority indication (e.g., a 5QI level) to meet the latency and reliability requirement.

An example priority function P may be:

$$f(5QI, GBR, PD) \text{ or } f(GBR, PD) \text{ or } f(5QI, PD) \quad \text{eq. 2}$$

wherein $$f(5QI, GBR, PD) = 5qiCoeff * 5qiPrio + GbrCoeff * GbrPrio + PdbCoeff * PdbPrio \quad \text{eq. 3}$$

$$f(GBR, PD) = GbrCoeff * GbrPrio + PdbCoeff * PdbPrio; \quad \text{eq. 4}$$

$$f(5QI, PD) = 5qiCoeff * 5qiPrio + PdbCoeff * PdbPrio; \quad \text{eq. 5}$$

and wherein 5qiCoeff is a 5QI coefficient parameter, 5qiPrio is a 5QI priority, GbrCoeff is Coefficient parameter of guaranteed bit rate, GbrPrio is a priority of guaranteed bit rate; Pdb is packet delay budget, PdbCoeff is the coefficient parameter of packet delay budget, PbdPrio is the priority of the packet delay budget.

By adjusting 5qiCoeff, GbrCoeff, and/or PdbCoeff in the formulas shown in eqs. 2-5, balance between serving UEs corresponding to traffic flows having URLLC/strict latency requirements often enough, with or without a minimum data rate requirement, and serving the best UEs (e.g., UEs experiencing the best channel conditions, or strongest signal strengths) to maximum the total system throughput may be achieved.

In the extreme case ({\displaystyle \alpha=0} 5qiCoeff=0, GbrCoeff=1 and PdbCoeff=1 {\displaystyle \beta} {\displaystyle \beta=1}), a scheduler may prioritize packets corresponding to a PDB, and may serve all UEs that correspond to traffic flows having packets which have PDB in a high priority way. Thus, extreme low latency service, for example XR, may be satisfied. If {\displaystyle \alpha=1} ({\displaystyle \alpha=0} 5qiCoeff=1, GbrCoeff=0 and PdbCoeff=1{\displaystyle \beta} {\displaystyle \beta=1}), a scheduler may prioritize packets corresponding to high 5QI and certain PDB. Thus, according to embodiments disclosed herein, a scheduler can adapt to support diverse services by adjusting function parameters 5qiCoeff, GbrCoeff, and/or PdbCoeff. 5QIprio can be logical channel priority (LcPrio), or PDU priority, or 5QI.

Returning to description of FIG. 4, a scheduler may determine if a packet corresponds to a high priority, or not, or if the packet corresponds to a latency budget, or not. The scheduler may then determine, for the packet determined to have a priority indication or a latency budget (or both), customized scheduling according to the determined priority indication or latency budget. For packets that are not determined to correspond to a latency budget or a priority indication, the schedule may schedule the packets according to a conventional scheduling function, for example PF scheduling.

Figure 6:
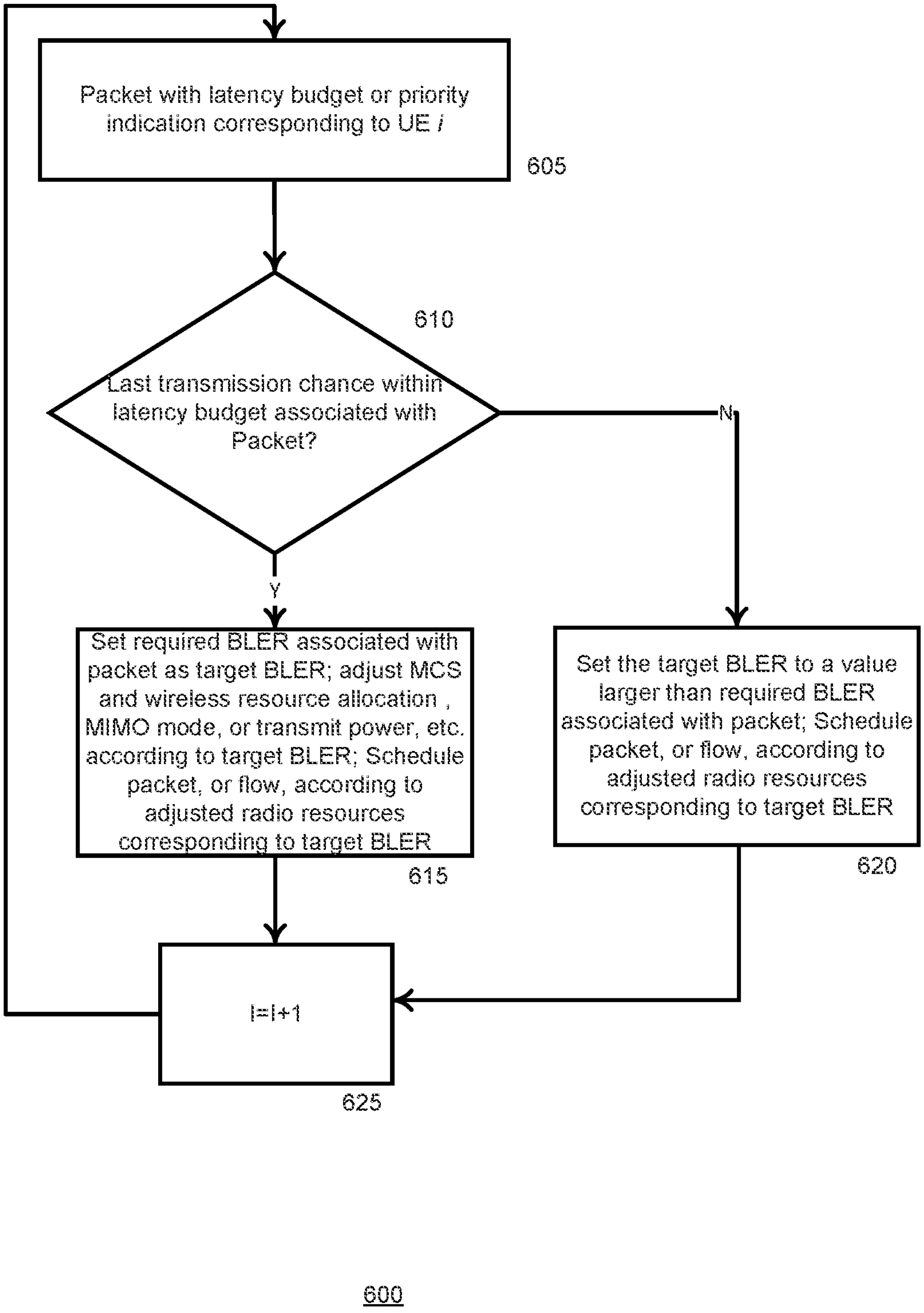
FIG. 6 illustrates a flow diagram of an example method to schedule traffic with which a latency characteristic is associated.

Turning now to FIG. 6, the figure illustrates a flow diagram of an example embodiment method 600 to adjust radio resource settings and to schedule traffic flow packets according to the adjusted settings based on whether the packets are associated with a latency budget or a priority/reliability indication. At act 605, a scheduler may evaluate traffic packets that are associated with a latency budget or a priority indication. At act 610, the scheduler may determine an amount of time, or a number of transmission opportunities, that may be available to transmit a given packet before a latency budget associated with the packet may be violated. If the latency budget associated with the packet indicates that there is more than a configured amount of time, or more than a configured number of transmission opportunities, available to transmit the packet such that an unsuccessful attempt to transmit a packet during a next available transmission opportunity and waiting until a next (e.g., a next transmission opportunity after the current, or soonest, next opportunity) transmission opportunity would not violate the latency budget, method 600 may advance to act 620. At act 620, the scheduler may assign a target block error rate to the packet that is higher than a block error rate associated with the packet. The scheduler may schedule the packet, or packets of a flow to which the packet belongs, according to radio resources that correspond to the higher adjusted block error rate. At act 620, the scheduler may set a target block error rate to a value that equals a required block error rate corresponding to the packet or corresponding to the traffic flow to which the packet belongs. The scheduler may schedule the packet or flow according to radio resources that have been adjusted according to the new target block error rate.

For example, for traffic corresponding to general Internet traffic or best effort traffic, a target block error rate may be set to 10%. The scheduler may adjust radio resources, for example, in modulation scheme, a data rate, or a transmit power to a complex modulation scheme, a fast data rate, or a low transmit power, all of which adjustments may tend to increase transmission error since a 10% error rate has been determined to be tolerable. Method 600 advances from act 620 to 625 and increments a counter before returning to act 605 and evaluating a packet associated with a traffic flow corresponding to a user equipment indicated by counter value that resulted from the incrementing at act 625.

Returning to description of act 610. If a determination is made that an unsuccessful transmission of a packet under evaluation at act 605 during a next available transmission opportunity, and having to wait for another transmission opportunity, would likely result in violation of a latency budget corresponding to the packet being evaluated at act 605, scheduler may advance to act 615. At act 615, the scheduler may set a target block error rate to a stringent block error rate that may correspond to the latency budget. The stringent block error rate, for example 0.00001%, may correspond to different radio resource functionality settings than were determined that act 620. For example, at act 615, a modulation scheme may be selected that is less complex than the modulation scheme selected at 620, thus requiring less processing capability at a receiver and thus increasing the likelihood that the receiver will successfully receive the packet. At act 615, a data rate may be determined that is slower than the data rate that was determined at act 620, also to ensure a greater likelihood that the packet is transmitted and received successfully. Similarly, a higher transmit power may be determined at act 615 than was determined at act 620, also to increase the likelihood of successful transmission of the packet. After scheduling the packet at act 615, method 600 advances to act 625, increments the counter, and returns to act 605 to evaluate another packet.

In an example, when there are two transmission opportunities within a packet's latency budget, the block error rate for a transmission attempt during the first transmission opportunity could be set to 10% or 20%, the corresponding modulation and coding scheme could be 16 QAM, and the code rate could be 0.67 bps. If there is only one transmission opportunity within the latency budget, the block error rate could be set close to the required block error rate corresponding to the packet, for example 0.001%, the corresponding MCS could be QPSK, and the code rate could be 0.007 bps.

Setting a target block error rate to a required block error rate to choose the MCS may facilitate the only one transmission of a packet being successfully received by the receiving device (RAN or UE), but more physical resource may be scheduled to enable the chosen MCS, for example, a very low code rate to improve block error rate, that may be otherwise scheduled for less critical traffic. Increasing transmit power for DL or UL, for example by 3 dB, may increase a probability of a successful reception of a packet transmitted during a last transmission opportunity within the latency budget.

By setting 10% or 20% block error rate for the first transmission attempt when more than one transmission opportunity is available within a latency budget corresponding to a packet, fewer physical resources, corresponding to a high block error rate, may be scheduled for a given packet payload. With a 10% BLER there is a 10% probability of having to retransmit the packet after a first transmission attempt when radio resources are adjusted according to a 10% block error rate. Since more than one transmission opportunity remains within the packet's latency budget a 10% retransmission probability may be acceptable. Compared with adjusting radio resources according to a block error rate of 0.001% as a target BLER, adjusting radio resource functionality according to a block error rate of 10% to 20% for an initial transmission attempt may result in reduced consumption of air interface resources and thus may result in increased system spectrum efficiency while possibly resulting in a successful transmission and reception.

Figure 7:
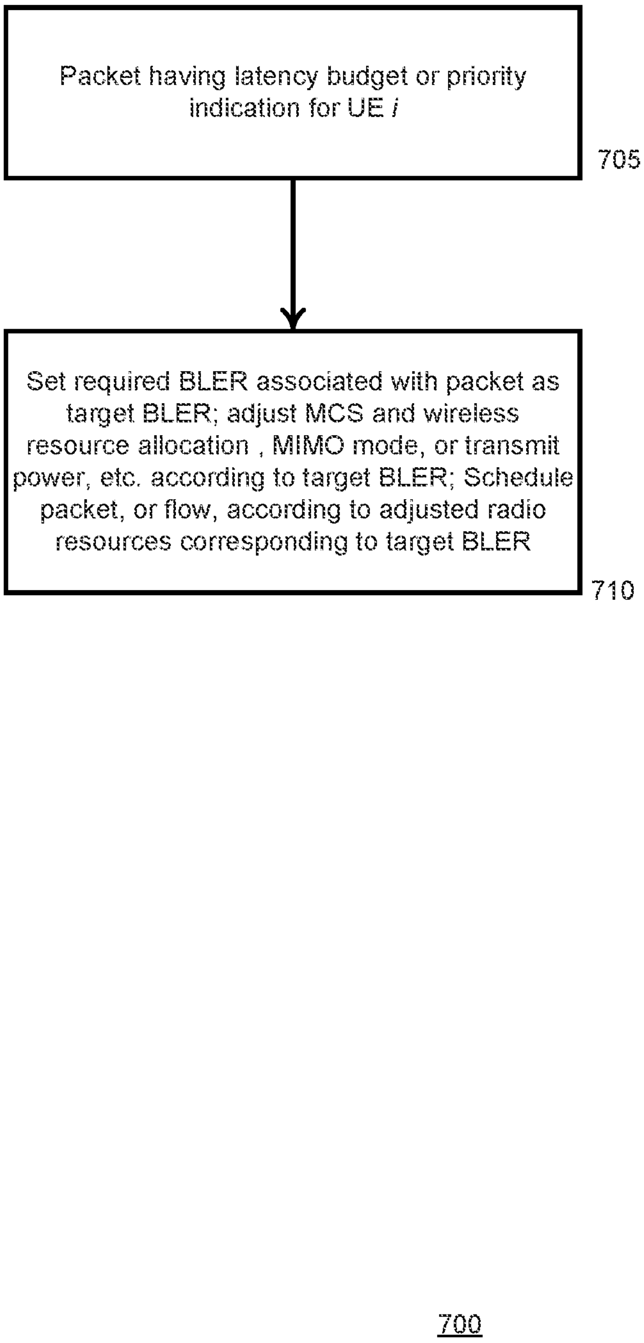
FIG. 7 illustrates another flow diagram of an example method to schedule traffic according to traffic characteristics.

Turning now to FIG. 7, the figure illustrates a flow diagram of an example embodiment method 700. A scheduler may schedule a packet being evaluated at act 705 that may be associated with a latency budget or a high priority without considering whether there is second transmission opportunity within the latency budget. At act 710, the scheduler may schedule, or adjust, radio resources to transmit the packet according to a block error rate that corresponds to the packet, or to the traffic flow to which the packet belongs. Method 700 may result in reduced processing delay as compared to the embodiment described in reference to FIG. 4 (by avoiding performance by the scheduler of steps 410 and 420), but may result in less system throughput compared with the embodiment described in reference to FIG. 4 due to implementing more conservative radio resource function settings, for example a less complex modulation scheme, a lower data rate, more antennas, or a higher transmit power without the option to use less conservative radio resource function if there is more than one transmission opportunity remaining in a latency budget corresponding to the packet.

Figure 8:
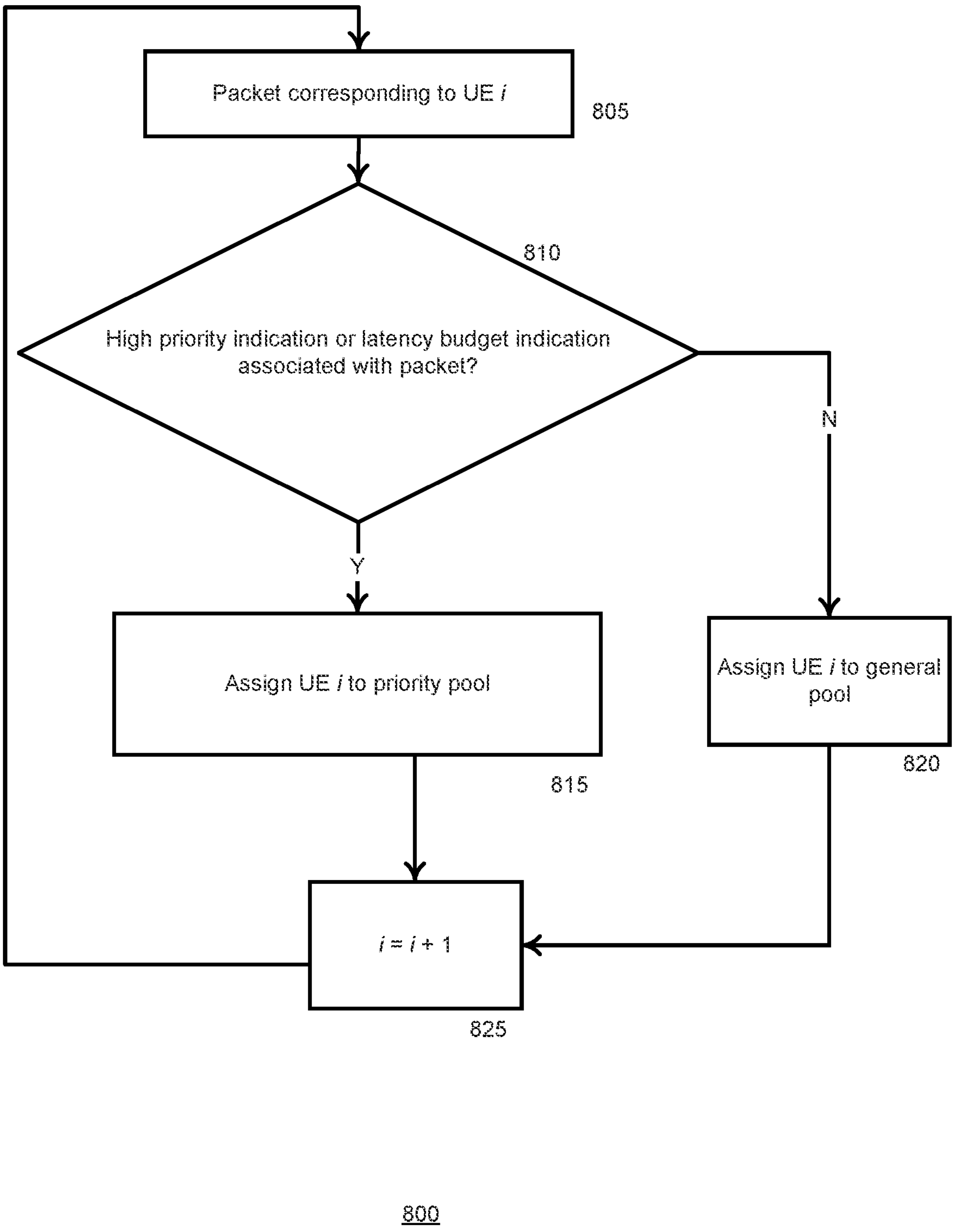
FIG. 8 illustrates a flow diagram of an example method to segregate traffic flows from multiple user equipment into a priority pool or user equipment and a general pool of user equipment based on traffic characteristics corresponding to the traffic flows.

Turning now to FIG. 8, the figure illustrates a flow diagram of an example method embodiment 800. Method 800 may be used in conjunction with the embodiment described in reference to FIG. 4 insofar as scheduler 300 may schedule a packet associated with a latency budget/priority indication for transmission before a transmission time scheduled for a packet that is not associated with a latency budget/priority indication. The embodiment shown in FIG. 8 may also be performed in combination with the embodiments described in reference to FIG. 6 or FIG. 7. At act 810, the scheduler may determine whether a packet being evaluated at act 805 is associated with a priority indication indicative of a high priority or high reliability, or whether the packet is associated with a latency budget. If a determination is made at act the 810 that the packet being evaluated at act 805 is associated with a high priority indication or is associated with the latency budget indication, the scheduler may assign the packet, or the user equipment to which the packet corresponds, to a priority pool at act 815. Method 800 may advance to 825, increment a counter, and return to act 805 and evaluate one or more packets corresponding to another user equipment indicated by the incremented counter.

Returning to description of act 810, if a determination is made that the packet being evaluated at act 805 is not associated with an indication of a high priority or a latency budget, method 800 advances to act 820. At act 820, the scheduler may assign the packet, or the user equipment corresponding to the packet, to a general pool before method 800 advances to act 825, increments the counter, and returns to act 805 to evaluate another packet corresponding to another user equipment. Thus, a scheduler may divide UEs into two groups of UEs, a priority pool and general pool, and adjust radio functionality and frequency and timing resources to facilitate reliable transmission of packets corresponding to the priority pool, and then facilitate performing of, for example, a PF scheduling function, with respect to user equipment assigned to the general pool.

Figure 9:
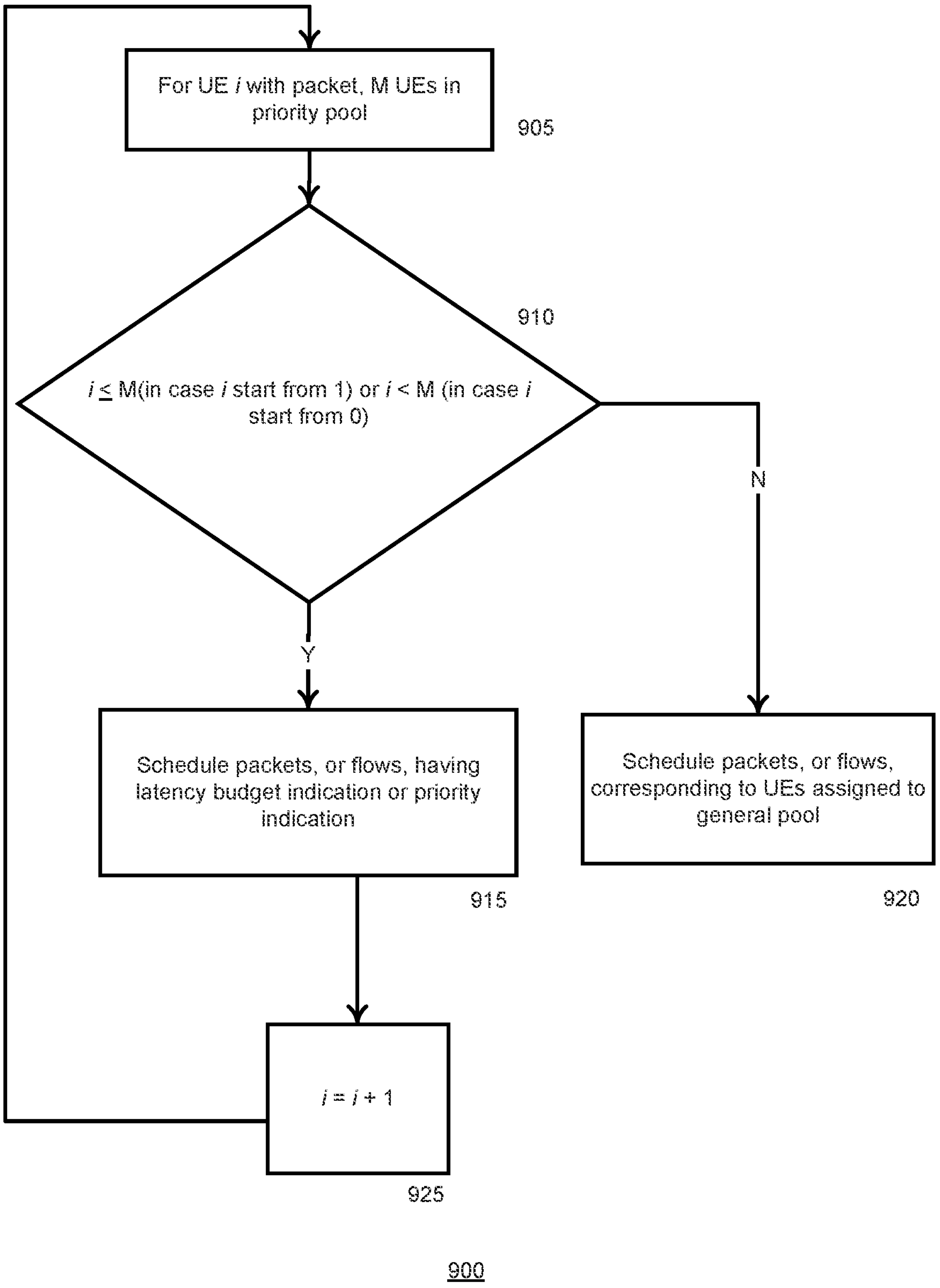
FIG. 9 illustrates a flow diagram of an example method to apply different radio resource configurations to user equipment in priority and general pools of user equipment.

Turning now to FIG. 9, the figure illustrates a flow diagram of an example embodiment method 900. By facilitating example method 900, a scheduler may facilitate scheduling traffic with respect to user equipment that have been segregated into a priority pool based on correspondence to a priority function. Because a latency budget quality parameter has been considered when choosing which user equipment are assigned to the priority pool (e.g., as described reference to FIG. 8), a function, exemplified in eq. 6, may facilitate maximizing system throughput with respect to UEs of a high priority pool, such as, for example, user equipment of group 215 shown in FIG. 2B.

$$f(5QI, GBR) = 5qiCoeff * 5qiPrio + GbrCoeff * GbrPrio \quad \text{eq. 6}$$

To facilitate end-to-end latency requirements for a traffic flow, a scheduler may facilitate scheduling of user equipment in a priority pool according to a round robin function, which may require less processing resources compared to a PF function, and thus may result in reduced processing time of implementing a scheduling function to satisfy end to end latency requirement in some scenarios.

Accordingly, the embodiment described in reference to FIG. 4 may facilitate determining whether a packet is associated with a priority indication or latency budget indication. The priority indication may be, for example: high, low, true, false, associated with 5QI, associated with logical channel ID. A latency budget indication can be carried via a protocol data unit (e.g., packet) header received from a CU. A latency budget indication can include real-time delay budget for a packet to which the latency budget indication corresponds. A latency budget indication can include a PDB determined based on a 5QI value (e.g., a 5QI may comprise an index indicative of a latency, a reliability, and/or other quality parameter values).

For a packet that is associated with a high priority indication or a latency budget, a scheduler may customize, or adjust, radio resource function settings to be reasonably optimized with respect to a latency budget or a priority corresponding to the packet. The scheduler may determine whether a next transmission opportunity is a last transmission opportunity within the latency budget and then may set a required block error rate corresponding to the packet as a target block error rate, which may be used as a basis for determining a modulation coding scheme and allocation of physical resource for transmission of the packet. Otherwise, if the packet is not associated with the priority or if the next transmission opportunity is not a last transmission opportunity within the latency budget corresponding to the packet, the scheduler may perform conventional scheduling with respect to the packet, for example the scheduler may apply a PF scheduling function in determining a scheduling of the packet.

In another embodiment, if a packet is associated with a priority indication or a latency budget, a scheduler may set a required block error rate corresponding to the packet as a target block error rate to be used as a basis to determine a modulation and coding scheme and physical resources to be allocated for transmission of the packet. If a priority indication or a latency budget is not associated with a packet, a scheduler may apply a conventional scheduling function, for example, a PF scheduling function, in determining a scheduling of the packet.

Figure 10:
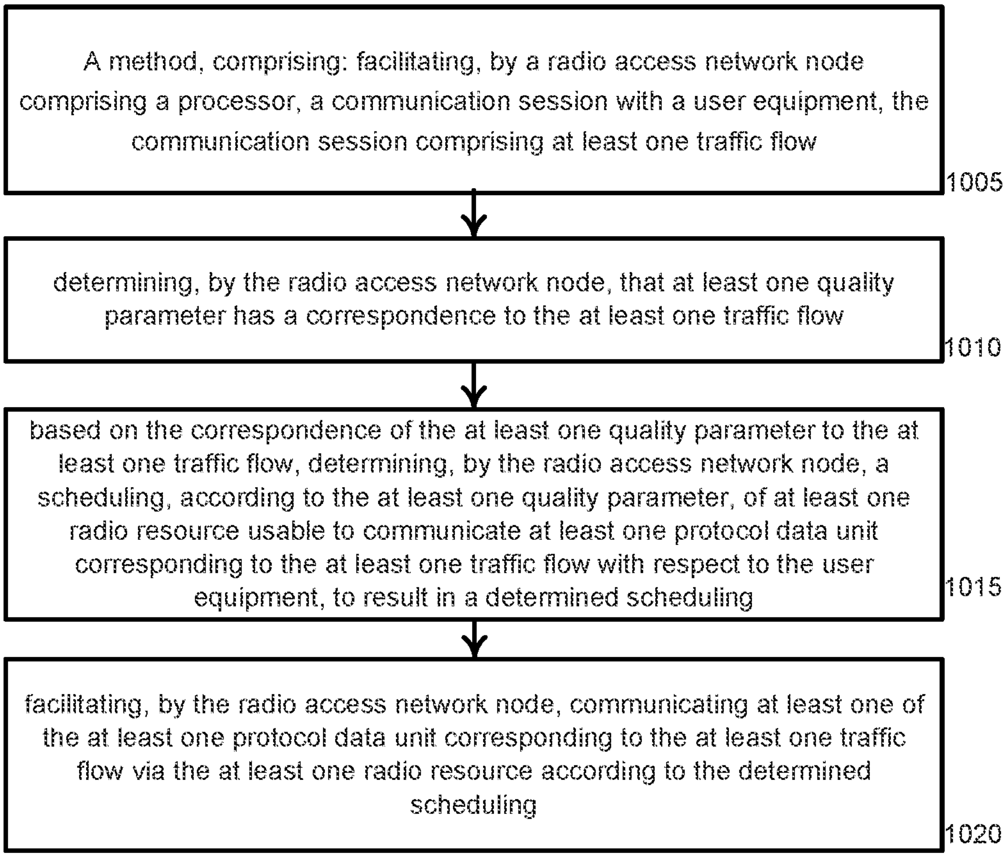
FIG. 10 illustrates a block diagram of an example method embodiment.

Turning now to FIG. 10, the figure illustrates an example embodiment method 1000 comprising at block 1005 facilitating, by a radio access network node comprising a processor, a communication session with a user equipment, the communication session comprising at least one traffic flow; at block 1010 determining, by the radio access network node, that at least one quality parameter has a correspondence to the at least one traffic flow; at block 1015 based on the correspondence of the at least one quality parameter to the at least one traffic flow, determining, by the radio access network node, a scheduling, according to the at least one quality parameter, of at least one radio resource usable to communicate at least one protocol data unit corresponding to the at least one traffic flow with respect to the user equipment, to result in a determined scheduling; and at block 1020 facilitating, by the radio access network node, communicating at least one of the at least one protocol data unit corresponding to the at least one traffic flow via the at least one radio resource according to the determined scheduling.

Figure 11:
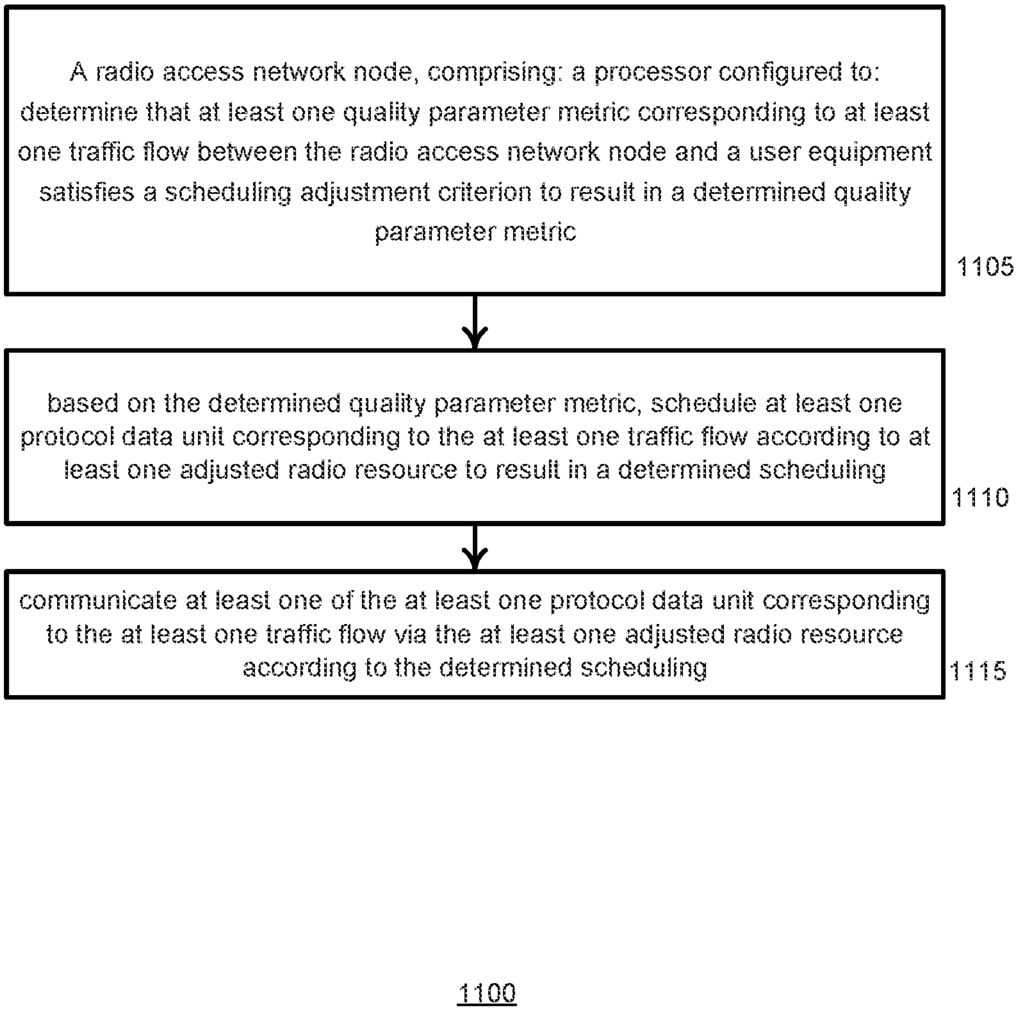
FIG. 11 illustrates a block diagram of an example radio access network node.

Turning now to FIG. 11, the figure illustrates an example radio access network node, comprising at block 1105 a processor configured to determine that at least one quality parameter metric corresponding to at least one traffic flow between the radio access network node and a user equipment satisfies a scheduling adjustment criterion to result in a determined quality parameter metric; at block 1110 based on the determined quality parameter metric, schedule at least one protocol data unit corresponding to the at least one traffic flow according to at least one adjusted radio resource to result in a determined scheduling; and at block 1015 communicate at least one of the at least one protocol data unit corresponding to the at least one traffic flow via the at least one adjusted radio resource according to the determined scheduling.

Figure 12:
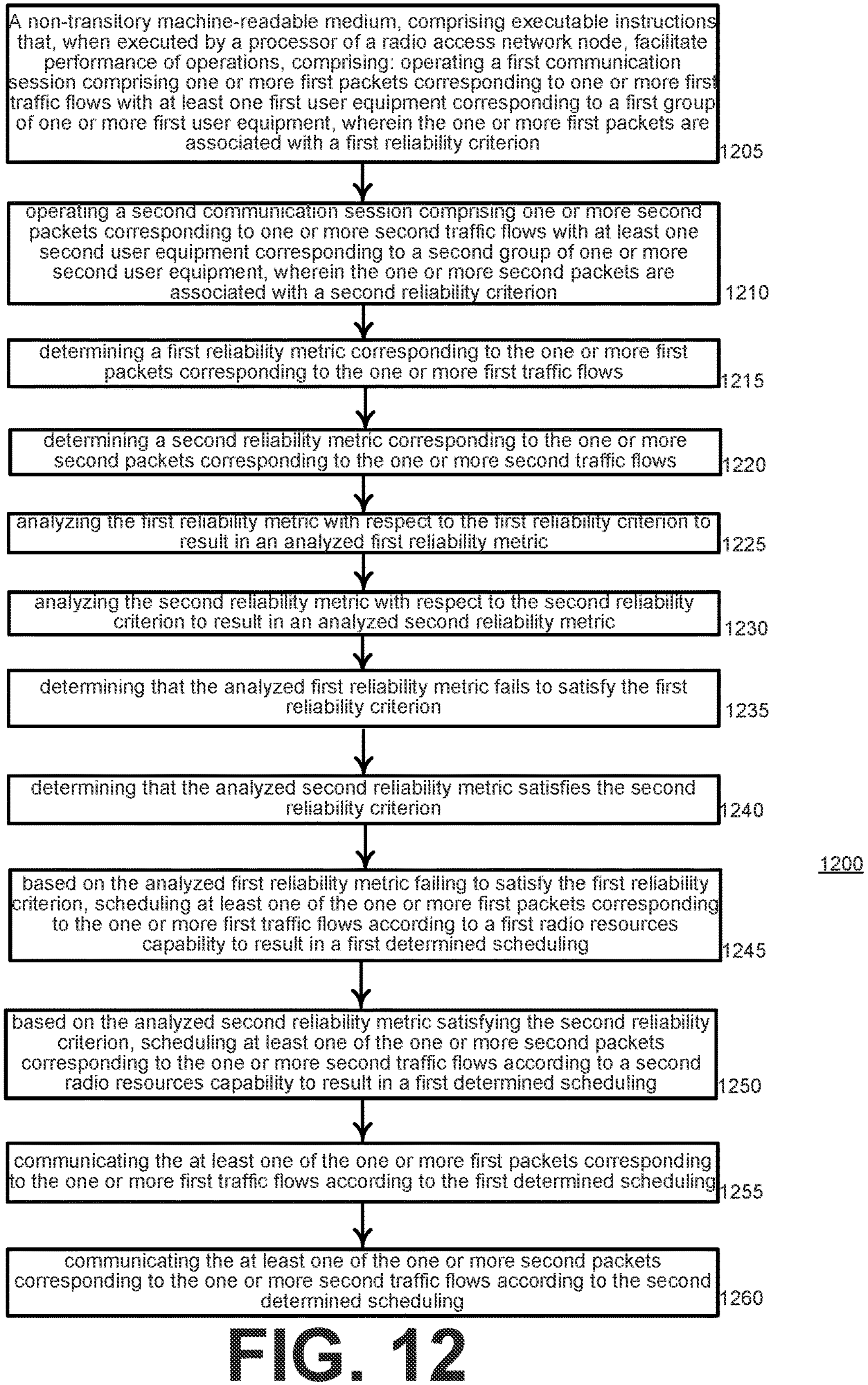
FIG. 12 illustrates a block diagram of an example non-transitory machine-readable medium embodiment.

Turning now to FIG. 12, the figure illustrates a non-transitory machine-readable medium 1200 comprising at block 1205 executable instructions that, when executed by a processor of a radio access network node, facilitate performance of operations, comprising operating a first communication session comprising one or more first packets corresponding to one or more first traffic flows with at least one first user equipment corresponding to a first group of one or more first user equipment, wherein the one or more first packets are associated with a first reliability criterion; at block 1210 operating a second communication session comprising one or more second packets corresponding to one or more second traffic flows with at least one second user equipment corresponding to a second group of one or more second user equipment, wherein the one or more second packets are associated with a second reliability criterion; at block 1215 determining a first reliability metric corresponding to the one or more first packets corresponding to the one or more first traffic flows; at block 1220 determining a second reliability metric corresponding to the one or more second packets corresponding to the one or more second traffic flows; at block 1225 analyzing the first reliability metric with respect to the first reliability criterion to result in an analyzed first reliability metric; at block 1230 analyzing the second reliability metric with respect to the second reliability criterion to result in an analyzed second reliability metric; at block 1235 determining that the analyzed first reliability metric fails to satisfy the first reliability criterion; at block 1240 determining that the analyzed second reliability metric satisfies the second reliability criterion; at block 1245 based on the analyzed first reliability metric failing to satisfy the first reliability criterion, scheduling at least one of the one or more first packets corresponding to the one or more first traffic flows according to a first radio resources capability to result in a first determined scheduling; at block 1250 based on the analyzed second reliability metric satisfying the second reliability criterion, scheduling at least one of the one or more second packets corresponding to the one or more second traffic flows according to a second radio resources capability to result in a first determined scheduling; at block 1255 communicating the at least one of the one or more first packets corresponding to the one or more first traffic flows according to the first determined scheduling; and at block 1260 communicating the at least one of the one or more second packets corresponding to the one or more second traffic flows according to the second determined scheduling.

Figure 13:
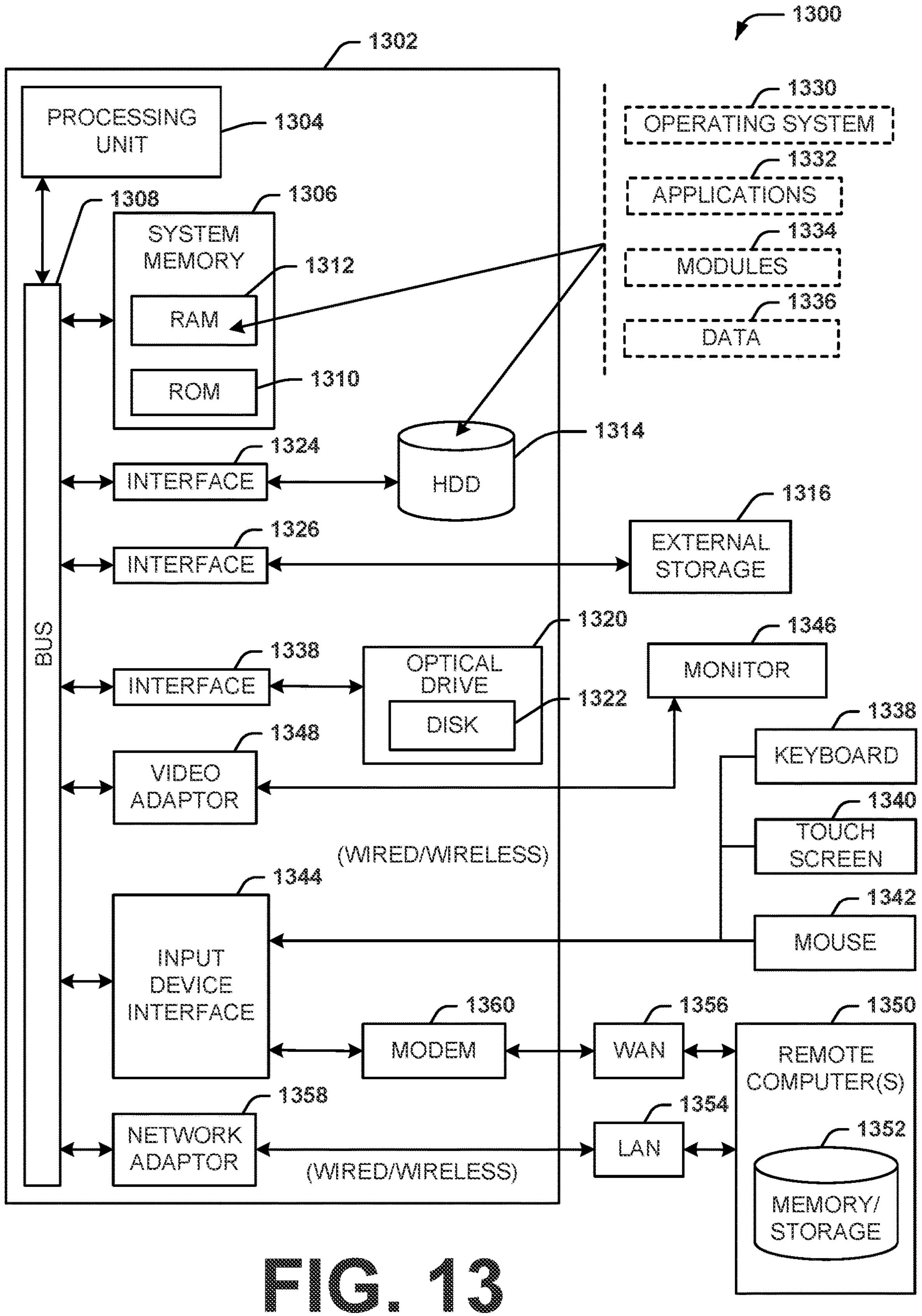
FIG. 13 illustrates an example computer environment.

In order to provide additional context for various embodiments described herein, FIG. 13 and the following discussion are intended to provide a brief, general description of a suitable computing environment 1300 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

Computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1310. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
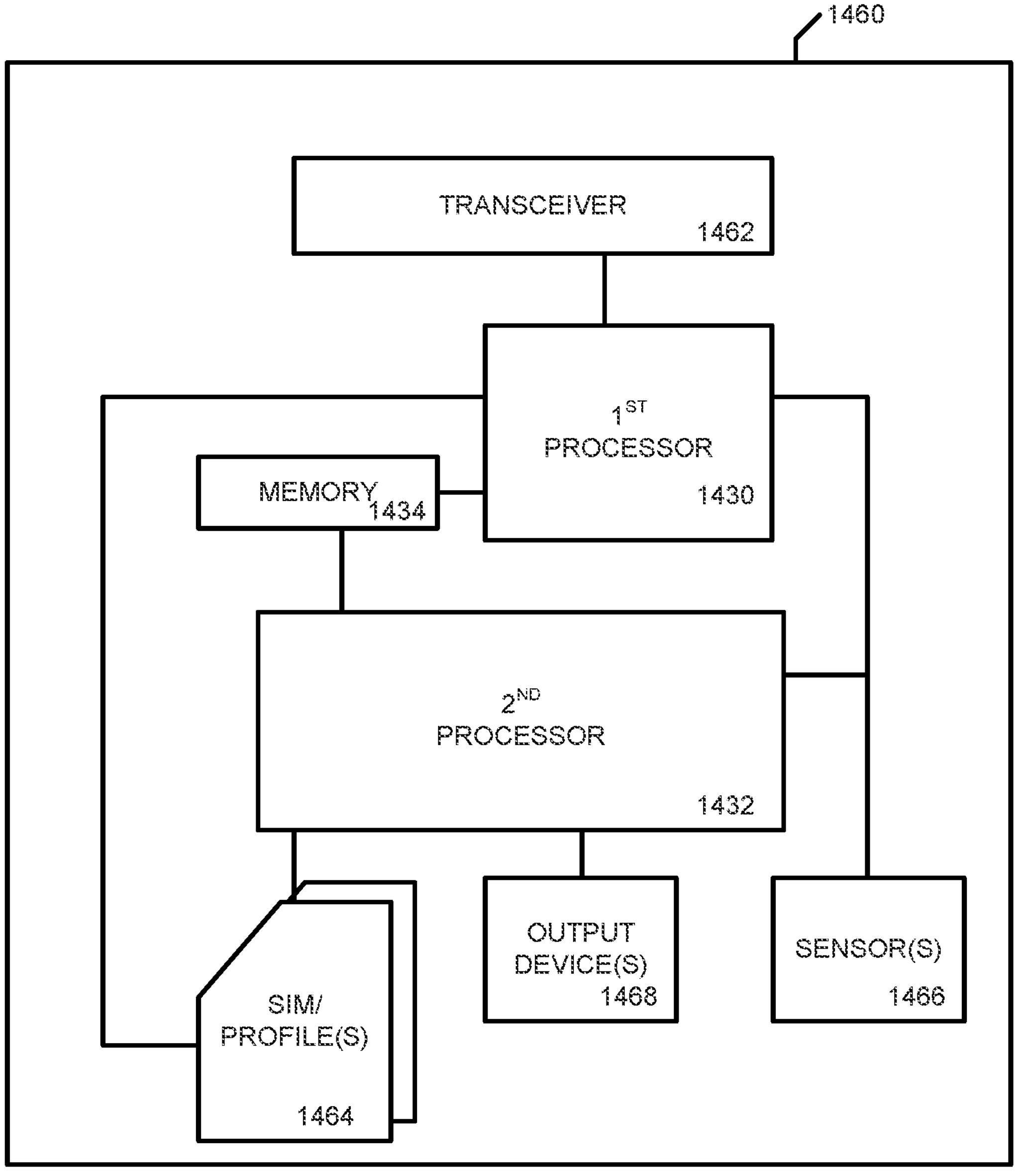
FIG. 14 illustrates a block diagram of an example wireless user equipment.

Turning now to FIG. 14, the figure illustrates a block diagram of an example UE 1460. UE 1460 may comprise a smart phone, a wireless tablet, a laptop computer with wireless capability, a wearable device, a machine device that may facilitate vehicle telematics, and the like. UE 1460 comprises a first processor 1430, a second processor 1432, and a shared memory 1434. UE 1460 includes radio front end circuitry 1462, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1462 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 14, UE 1460 may also include a SIM 1464, or a SIM profile, which may comprise information stored in a memory (memory 34 or a separate memory portion), for facilitating wireless communication with RAN 105 or core network 130 shown in FIG. 1. FIG. 14 shows SIM 1464 as a single component in the shape of a conventional SIM card, but it will be appreciated that SIM 1464 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1464 and another device, which may be a component of RAN 105 or core network 130 shown in FIG. 1). A SIM profile 1464 may also comprise identifying information that is unique to the SIM, or SIM profile, such as, for example, an International Mobile Subscriber Identity ("IMSI") or information that may make up an IMSI.

SIM 1464 is shown coupled to both the first processor portion 1430 and the second processor portion 1432. Such an implementation may provide an advantage that first processor portion 30 may not need to request or receive information or data from SIM 1464 that second processor 1432 may request, thus eliminating the use of the first processor acting as a 'go-between' when the second processor uses information from the SIM in performing its functions and in executing applications. First processor 1430, which may be a modem processor or baseband processor, is shown smaller than processor 1432, which may be a more sophisticated application processor, to visually indicate the relative levels of sophistication (i.e., processing capability and performance) and corresponding relative levels of operating power consumption levels between the two processor portions. Keeping the second processor portion 1432 asleep/inactive/in a low power state when UE 1460 does not need it for executing applications and processing data related to an application provides an advantage of reducing power consumption when the UE only needs to use the first processor portion 1430 while in listening mode for monitoring routine configured bearer management and mobility management/maintenance procedures, or for monitoring search spaces that the UE has been configured to monitor while the second processor portion remains inactive/asleep.

UE 1460 may also include sensors 1466, such as, for example, temperature sensors, accelerometers, gyroscopes, barometers, moisture sensors, and the like that may provide signals to the first processor 1430 or second processor 1432. Output devices 1468 may comprise, for example, one or more visual displays (e.g., computer monitors, VR appliances, and the like), acoustic transducers, such as speakers or microphones, vibration components, and the like. Output devices 1468 may comprise software that interfaces with output devices, for example, visual displays, speakers, microphones, touch sensation devices, smell or taste devices, and the like, that are external to UE 1460.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |

TABLE 1-continued

| Term | Definition |
|---|---|
| DTX | Discontinuous transmission |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |
| PRB | Physical resource block |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio access network node comprising at least one processor, a communication session with at least one user equipment, the communication session comprising at least one first traffic flow;

determining, by the radio access network node, correspondence of at least one quality parameter to the at least one first traffic flow; wherein the at least one quality parameter is determined to correspond to the at least one first traffic flow in response to determining that the at least one first traffic flow comprises critical traffic according to a criticality criterion, and wherein the at least one quality parameter is determined not to correspond to the at least one first traffic flow in response to determining that the at least one first traffic flow comprises non-critical traffic according to the criticality criterion;

based on the at least one quality parameter being determined to correspond to the at least one first traffic flow, determining, by the radio access network node, a first scheduling, according to the at least one quality parameter, of at least one radio resource usable to communicate at least one first protocol data unit corresponding to the at least one first traffic flow with respect to the user equipment, to result in a first determined scheduling; and facilitating, by the radio access network node, communicating at least one of the at least one first protocol data unit corresponding to the at least one first traffic flow via the at least one radio resource according to the first determined scheduling, wherein the communication session further comprises at least one second traffic flow;

determining, by the radio access network node, that the at least one quality parameter does not correspond to the at least one second traffic flow; and based on the at least one quality parameter being determined not to correspond to the at least one second traffic flow, determining, by the radio access network node, a second scheduling of the at least one radio resource to be usable to communicate, with respect to the user equipment, at least one second protocol data unit corresponding to the at least one second traffic flow, to result in a second determined scheduling, wherein the at least one quality parameter is excluded from the determining of the second determined scheduling.

2. The method of claim 1, wherein the at least one quality parameter is at least one of: a latency budget parameter, a reliability parameter, or a priority parameter.

3. The method of claim 1, wherein the first determined scheduling corresponds to scheduling usage of at least one of: a modulation scheme, a coding rate, a transmission power level, a precoding function, a spatial multiplexing function, or a diversity coding function.

4. The method of claim 1, wherein the at least one quality parameter is at least one latency budget parameter corresponding to the at least one first protocol data unit, and wherein the method further comprises:

based on the at least one quality parameter being determined not to correspond to the at least one second traffic flow, determining, by the radio access network node, that more than one transmission opportunity corresponding to at least one of the at least one second protocol data unit associated with the at least one second traffic flow is available with respect to the at least one latency budget parameter, wherein the at least one second traffic flow is associated with a specified error rate, and wherein the second determined scheduling comprises the at least one second protocol data unit associated with the at least one second traffic flow being scheduled for transmission at a target error rate that exceeds the specified error rate.

5. The method of claim 4, wherein the second determined scheduling further comprises applying at least one of: proportional-fair scheduling or round robin scheduling.

6. The method of claim 1, wherein the at least one quality parameter that corresponds to the at least one second traffic flow comprises at least one latency budget parameter corresponding to the at least one first protocol data unit associated with the at least one second traffic flow, and wherein the method further comprises:

determining, by the radio access network node, that a transmission opportunity corresponding to the at least one second protocol data unit associated with the at least one second traffic flow is a last transmission opportunity with respect to the at least one latency budget corresponding to the at least one second protocol data unit associated with the at least one second traffic flow, wherein the at least one second traffic flow is associated with a specified error rate, and wherein the second determined scheduling comprises the at least one second protocol data unit associated with the at least one second traffic flow being scheduled for transmission at a target error rate that corresponds to the specified error rate.

7. The method of claim 6, wherein the communication session is associated with a baseline modulation and coding scheme that comprises a baseline coding rate and a baseline transmit power, and wherein the second determined scheduling further comprises the at least one first protocol data unit being scheduled for transmission according to at least one of: a low coding rate that is lower than the baseline coding rate or a high transmit power that is higher than the baseline transmit power.

8. The method of claim 1, wherein the at least one quality parameter is at least one first quality parameter associated with the at least one first traffic flow, and wherein the at least one first traffic flow is associated with a first user equipment of the at least one user equipment, and wherein the method further comprises:

facilitating, by the radio access network node communicating, with a second user equipment, the at least one a second traffic flow according to at least one second quality parameter.

9. The method of claim 8, wherein the first user equipment is a member of a first group of user equipment corresponding to critical traffic first traffic flows associated with the at least one first quality parameter, wherein the second user equipment is a member of a second group of user equipment corresponding to non-critical traffic associated with the at least one second quality parameter, wherein the at least one first quality parameter and the at least one second quality parameter comprise a same parameter, and wherein the first determined scheduling specifies and the second determined scheduling specifies that communicating the first traffic flows is to be facilitated before communicating the at least one second traffic flows is facilitated.

10. The method of claim 1, further comprising:

determining, by the radio access network node, that a next transmission opportunity is a last transmission opportunity before a latency budget, associated with the at least one first traffic flow, is violated;

determining, by the radio access network node, a third scheduling of the at least one radio resource to be usable to communicate, with respect to the user equipment, the at least one first protocol data unit corresponding to the at least one first traffic flow, to result in a third determined scheduling; and facilitating, by the radio access network node, communicating the at least one first protocol data unit corresponding to the at least one first traffic flow according to the third determined scheduling.

11. A radio access network node, comprising:

at least one processor configured to:

determine correspondence of at least one quality parameter to at least one traffic flow between the radio access network node and at least one user equipment, wherein the at least one quality parameter is determined to correspond to the at least one traffic flow in response to determining that the at least one traffic flow comprises critical traffic according to at least one criticality criterion, and wherein the at least one quality parameter is determined not to correspond to the at least one traffic flow in response to determining that the at least one traffic flow comprises non-critical traffic according to the at least one criticality criterion;

based on the at least one quality parameter being determined to correspond to a first traffic flow of the at least one traffic flow, schedule at least one radio resource usable to communicate, according to the at least one quality parameter, at least one first protocol data unit corresponding to the first traffic flow to result in a first determined scheduling;

communicate the at least one first protocol data unit corresponding to the first traffic flow via the at least one radio resource according to the first determined scheduling, wherein the at least one traffic flow comprises a second traffic flow;

determine that the at least one quality parameter does not correspond to the second traffic flow; and based on the at least one quality parameter being determined not to correspond to the second traffic flow, determine a second scheduling of the at least one radio resource to be usable to communicate at least one second protocol data unit corresponding to the second traffic flow to result in a second determined scheduling, wherein the at least one quality parameter is excluded from the determining of the second determined scheduling.

12. The radio access network node of claim 11, wherein at least one of the at least one radio resource corresponds to at least one of: an at least one modulation scheme, an at least one coding rate, or an at least one transmit power.

13. The radio access network node of claim 11, wherein at least one quality parameter metric corresponding to the at least one determined quality parameter comprises at least one indication of at least one number of transmission opportunities remaining before at least one latency budget, associated with the at least one traffic flow, is violated with respect to the at least one traffic flow, and wherein the first determined scheduling is determined based on the at least one quality parameter metric being indicative that a next transmission opportunity is a last transmission opportunity before the at least one latency budget is violated.

14. The radio access network node of claim 13, wherein the at least one traffic flow corresponds to at least one desired error rate, and wherein the first determined scheduling comprises configuring at least one transmitter to transmit the at least one first protocol data unit corresponding to the first traffic flow according to at least one modulation scheme corresponding to the at least one desired error rate.

15. The radio access network node of claim 11, wherein the at least one processor is further configured to communicate the at least one second protocol data unit corresponding to the second traffic flow via the at least one radio resource according to the second determined scheduling, wherein the at least one first protocol data unit and the at least one second protocol data unit are communicated according to a round robin order.

16. A non-transitory machine-readable medium, comprising executable instructions that, when executed by at least one processor of a radio access network node, facilitate performance of operations, comprising:

operating a first communication session comprising one or more first packets corresponding to one or more first traffic flows with at least one first user equipment corresponding to a first group of one or more first user equipment, wherein the one or more first packets are associated with a first reliability criterion;

operating a second communication session comprising one or more second packets corresponding to one or more second traffic flows with at least one second user equipment corresponding to a second group of one or more second user equipment, wherein the one or more second packets are associated with a second reliability criterion;

determining a first reliability metric corresponding to the one or more first packets corresponding to the one or more first traffic flows;

determining a second reliability metric corresponding to the one or more second packets corresponding to the one or more second traffic flows;

analyzing the first reliability metric with respect to the first reliability criterion to result in an analyzed first reliability metric, wherein the first reliability criterion corresponds to critical traffic;

analyzing the second reliability metric with respect to the second reliability criterion to result in an analyzed second reliability metric, wherein the second reliability criterion corresponds to non-critical traffic;

determining that the analyzed first reliability metric fails to satisfy the first reliability criterion;

determining that the analyzed second reliability metric satisfies the second reliability criterion;

based on the analyzed first reliability metric failing to satisfy the first reliability criterion, scheduling at least one of the one or more first packets corresponding to the one or more first traffic flows according to a first radio resources capability to result in a first determined scheduling, wherein the first radio resources capability corresponds to at least one first radio resource that is usable to communicate traffic according to the first reliability criterion;

based on the analyzed second reliability metric satisfying the second reliability criterion, scheduling at least one of the one or more second packets corresponding to the one or more second traffic flows according to a second radio resources capability to result in a second determined scheduling, wherein the second radio resources capability corresponds to at least one second radio resource that is usable to communicate traffic according to the second reliability criterion and that is not usable to communicate traffic according to the first reliability criterion;

communicating the at least one of the one or more first packets corresponding to the one or more first traffic flows according to the first determined scheduling; and communicating the at least one of the one or more second packets corresponding to the one or more second traffic flows according to the second determined scheduling.

17. The non-transitory machine-readable medium of claim 16, wherein the second radio resources capability comprises at least one of: a baseline modulation scheme corresponding to a baseline error rate, a baseline coding rate, a baseline transmit power, or a baseline antenna activation arrangement mode; wherein the first radio resources capability comprises at least one of: an optimized modulation scheme corresponding to a lower error rate than the baseline error rate, an optimized coding rate that is lower than the baseline coding rate, an optimized transit power that is higher than the baseline transmit power, or an optimized antenna activation arrangement mode that comprises more active antennas than the baseline antenna activation arrangement mode comprises.

18. The non-transitory machine-readable medium of claim 16, wherein the first determined scheduling comprises prioritizing the communicating the at least one of the one or more first packets corresponding to the one or more first traffic flows according to the first determined scheduling according to a proportional fair function.

19. The non-transitory machine-readable medium of claim 16, wherein the at least one of the one or more first packets corresponding to the one or more first traffic flows is communicated according to the first determined scheduling before the at least one of the one or more second packets corresponding to the one or more second traffic flows is communicated according to the second determined scheduling.

20. The non-transitory machine-readable medium of claim 16, the operations further comprising:

analyzing a latency metric corresponding to the at least one of the one or more first packets corresponding to the one or more first traffic flows with respect to a latency criterion to result in an analyzed latency metric, wherein the first determined scheduling is further based on the analyzed latency metric.

* * * * *